(12) United States Patent
Salkintzis

(10) Patent No.: US 11,632,818 B2
(45) Date of Patent: *Apr. 18, 2023

(54) MULTI-ACCESS DATA CONNECTION IN A MOBILE NETWORK

(71) Applicant: Motorola Mobility LLC, Chicago, IL (US)

(72) Inventor: Apostolis Salkintzis, Athen (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,393

(22) Filed: Sep. 6, 2021

(65) Prior Publication Data
US 2021/0400753 A1  Dec. 23, 2021

Related U.S. Application Data

(63) Continuation of application No. 16/748,536, filed on Jan. 21, 2020, now Pat. No. 11,116,028, which is a
(Continued)

(51) Int. Cl.
*H04W 76/15* (2018.01)
*H04L 67/14* (2022.01)
(Continued)

(52) U.S. Cl.
CPC ............ *H04W 76/15* (2018.02); *H04L 67/14* (2013.01); *H04W 28/0268* (2013.01);
(Continued)

(58) Field of Classification Search
CPC .................................................. H04W 76/15
See application file for complete search history.

(56) References Cited

U.S. PATENT DOCUMENTS 7,007,062 B1 * 2/2006 Serenyi .............. H04N 21/6437
709/203
9,386,478 B2  7/2016 Hong et al.
(Continued)

FOREIGN PATENT DOCUMENTS

WO  2015/126999 A1  8/2015

OTHER PUBLICATIONS

3GPP, "3rd Generation Partnership Project; Technical Specification Group Services and System Aspects; Network-Based IP Flow Mobility (NBIFOM); Stage 2 (Release 13)", 3GPP TS 23.161 V13.5.0, Dec. 2016, pp. 1-67.
(Continued)

*Primary Examiner* — Hsinchun Liao
(74) *Attorney, Agent, or Firm* — Kunzler Bean & Adamson

(57) ABSTRACT

Apparatuses, methods, and systems are disclosed for establishing a multi-access data connection. One apparatus includes a processor and a transceiver that communicates with one or more network functions in a mobile communication network. The processor receives a first session management request containing: a second session management request sent by a UE, a first indication that the UE requests a single-access data connection and a second indication that the UE allows the network to upgrade the data connection. The processor sends a request to establish a data path for each access network with which the UE is registered, where each data path is anchored at a common user plane network function in the mobile communication network.

20 Claims, 13 Drawing Sheets

Related U.S. Application Data continuation-in-part of application No. 16/348,470, filed as application No. PCT/EP2017/067227 on Jul. 10, 2017, now Pat. No. 10,785,820.

(60) Provisional application No. 62/835,459, filed on Apr. 17, 2019.

(51) Int. Cl.
*H04W 28/24* (2009.01)
*H04W 88/06* (2009.01)
*H04W 36/14* (2009.01)
*H04W 48/18* (2009.01)
*H04W 28/02* (2009.01)

(52) U.S. Cl.
CPC ........... *H04W 28/24* (2013.01); *H04W 36/14* (2013.01); *H04W 48/18* (2013.01); *H04W 88/06* (2013.01)

(56) References Cited

U.S. PATENT DOCUMENTS

| | | | |
|---|---|---|---|
| 2005/0233760 A1* | 10/2005 | Voltolina | H04L 12/189 455/503 |
| 2005/0246442 A1 | 11/2005 | Gutjahr | |
| 2008/0188223 A1 | 8/2008 | Vesterinen et al. | |
| 2009/0097470 A1* | 4/2009 | Collier | H04L 69/18 370/351 |
| 2011/0103303 A1 | 5/2011 | Hsu et al. | |
| 2011/0103305 A1 | 5/2011 | Ali et al. | |
| 2012/0250616 A1 | 10/2012 | Hu et al. | |
| 2013/0016696 A1 | 1/2013 | Adjakple et al. | |
| 2022/0295585 A1 | 9/2022 | Salkintzis et al. | |

OTHER PUBLICATIONS

3GPP, "3rd Generation Partnership Project; Technical Specification Group Services and System Aspects; Study on Architecture for Next Generation System (Release 14)", 3GPP TR 23.799 V14.0.0, Dec. 2016, pp. 1-260.

Motorola Mobility, Lenovo, "Establishment of MA-PDU Sessions", SA WG2 Meeting #125 S2-180273, Jan. 22-26, 2018, pp. 1-3.

3GPP "3rd Generation Partnership Project; Technical Specification Group Services and System Aspects; Procedures for the 5G System; Stage 2 (Release 15)", 3GPP TS 23.502 V0.5.0, Jul. 2017, pp. 1-148.

3GPP, "3rd Generation Partnership Project; Technical Specification Group Services and System Aspects; System Architecture for the 5G System; Stage 2 (Release 15)", 3GPP TS 23.501 V1.1.0, Jul. 2017, pp. 1-165.

U.S. Appl. No. 62/476,429, filed Mar. 2017, Faccin.

\* cited by examiner

MULTI-ACCESS DATA CONNECTION IN A MOBILE NETWORK

CROSS-REFERENCE TO RELATED APPLICATIONS

This application claims priority to co-pending U.S. patent application Ser. No. 16/748,536 entitled "MULTI-ACCESS DATA CONNECTION IN A MOBILE NETWORK" and filed on Jan. 21, 2020 for Apostolis Salkintzis, which is incorporated herein by reference. U.S. patent application Ser. No. 16/748,536 claims priority to U.S. Provisional Patent Application No. 62/835,459 entitled "Multi-Access Data Connection in a Mobile Network" and filed on Apr. 17, 2019 for Apostolis Salkintzis, which is incorporated herein by reference. U.S. patent application Ser. No. 16/748,536 is a continuation-in-part of—and claims priority to—U.S. patent application Ser. No. 16/348,470 entitled "Multi-Access Data Connection in a Mobile Network" and filed on May 8, 2019 for Apostolis Salkintzis and Dimitrios Karampatsis, which patent application claims priority to International Patent Application No. PCT/EP2017/067227 entitled "Multi-Access Data Connection in a Mobile Network" and filed Jul. 10, 2017 for Apostolis Salkintzis and Dimitrios Karampatsis, the entire disclosures of each are hereby incorporated by reference.

FIELD

The subject matter disclosed herein relates generally to wireless communications and more particularly relates to establishing a multi-access data connection over one or more access networks.

BACKGROUND

The following abbreviations and acronyms are herewith defined, at least some of which are referred to within the following description.

Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Clear Channel Assessment ("CCA"), Control Channel Element ("CCE"), Channel State Information ("CSI"), Common Search Space ("CSS"), Discrete Fourier Transform Spread ("DFT-S"), Downlink Control Information ("DCI"), Discrete Fourier Transform Spread OFDM ("DFT-S-OFDM"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MC S"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Negative-Acknowledgment ("NACK") or ("NAK"), Network Function ("NF"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Switching/Splitting Function ("SSF"), Scheduling Request ("SR"), Session Management Function ("SMF"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TB S"), Transmission Control Protocol ("TCP"), Time-Division Duplex ("TDD"), Time Division Multiplex ("TDM"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, the core network is to support Multi-Access PDU (MA-PDU) sessions between 3GPP access networks (including LTE, evolved LTE, and New Radio) and non-3GPP (typically WLAN) access networks. A MA-PDU session refers to a data session composed of two (and, rarely, of more) PDU sessions that share the same attributes (e.g., the same S-NSSAI, same SSC mode, same DNN, same type, same address/prefix, etc.), but are established over different types of access networks (e.g., over a 3GPP AN and a WLAN). These PDU sessions established over different types of access networks are terminated at same UPF anchor (UPF-A).

However, establishing a MA-PDU session currently requires two separate UE-requested PDU sessions. First, an initial PDU session over one access is established and then an additional PDU over a different access is also established. The additional PDU session becomes "linked" with the initial PDU session because it was established to the same APN and also because it contains a Network-Based IP Flow Mobility ("NBIFOM") indication.

BRIEF SUMMARY

Methods for establishing a multi-access data connection are disclosed. Apparatuses and systems also perform the functions of the methods.

In some embodiments, a method of a session management function ("SMF") for establishing a multi-access data connection includes receiving a first session management request via an access management function. Here, the first session management request contains: a second session management request sent by a remote unit, a first indication that the remote unit requests a single-access data connection, and a second indication that the remote unit allows the network to upgrade the data connection. The method includes sending a request to the access management function to establish a data path for each access network with which the remote unit is registered. Here, each data path is anchored at a common user plane network function in the mobile communication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
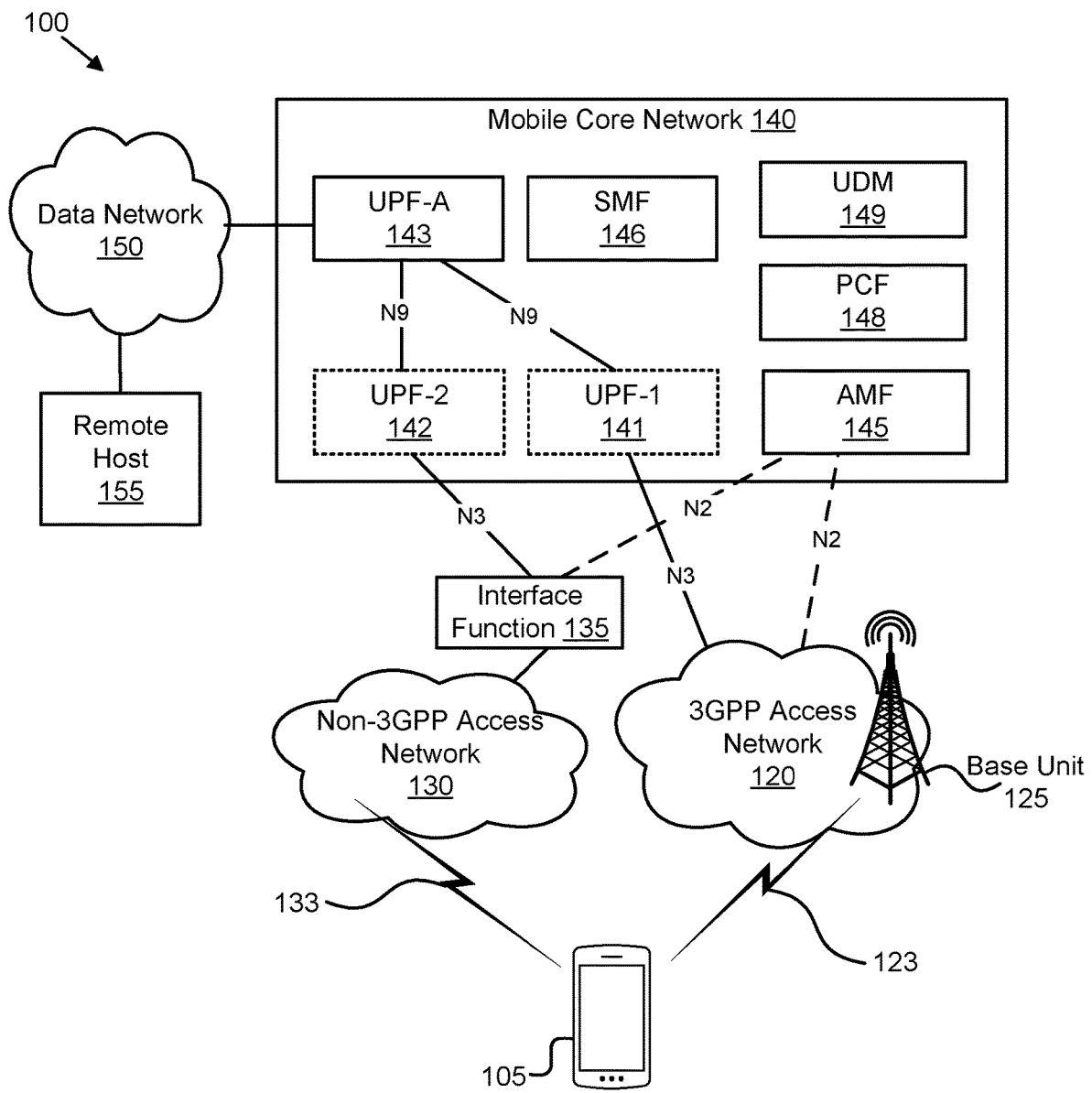
FIG. 1 is a schematic block diagram illustrating one embodiment of a wireless communication system for establishing a multi-access data connection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed to allow a UE to establish a Multi-Access PDU (MA-PDU) session, or other multi-access data connection, by sending a single Session Management (SM) request message towards the mobile communication network. As described herein, the establishment of a multi-access data connection may be UE initiated or network initiated. Although a MA-PDU session is commonly used as an example to describe the establishment of the multi-access data connection, other types of multi-access data connection may be established using the disclosed methods, apparatuses, systems, and procedures.

FIG. 1 depicts a wireless communication system 100 for establishing a multi-access data connection, according to embodiments of the disclosure. In one embodiment, the wireless communication system 100 includes at least one remote unit 105, a 3GPP access network 120 containing at least one cellular base unit 125, a non-3GPP access network 130, 3GPP communication links 123, non-3GPP access communication links 133, and a mobile core network 140. Even though a specific number of remote units 105, 3GPP access networks 120, base units 125, 3GPP communication links 123, non-3GPP access networks 130, non-3GPP communication links 133, and mobile core networks 140 are depicted in FIG. 1, one of skill in the art will recognize that any number of remote units 105, 3GPP access networks 120, base units 125, 3GPP communication links 123, non-3GPP access networks 130, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 125 via uplink ("UL") and downlink ("DL") communication signals. Furthermore, the UL and DL communication signals may be carried over the 3GPP communication links 123. Similarly, the remote units 105 may communicate with one or more non-3GPP access networks 130 via UL and DL communication signals carried over the non-3GPP communication links 133.

In some embodiments, the remote units 105 communicate with a remote host 155 via a network connection with the mobile core network 140. For example, a remote unit 105 may establish a PDU connection (or other data connection) with the mobile core network 140 using a 3GPP access network 120 and/or a non-3GPP access network 130. The mobile core network 140 then relays traffic between the remote unit 105 and the remote host 155 using the PDU connection. In other embodiments, the remote unit 105 may communicate with the remote host 155 over the non-3GPP access network 130 without traffic passing through the mobile core network 140. This is referred to as direct offloading.

The base units 125 may be distributed over a geographic region. In certain embodiments, a base unit 125 may also be referred to as an access terminal, a base, a base station, a Node-B, an eNB, a gNB, a Home Node-B, a relay node, a device, or by any other terminology used in the art. The base units 125 are generally part of a radio access network ("RAN"), such as the 3GPP access network 120, that may include one or more controllers communicably coupled to one or more corresponding base units 125. These and other elements of radio access network are not illustrated but are well known generally by those having ordinary skill in the art. The base units 125 connect to the mobile core network 140 via the 3GPP access network 120.

The base units 125 may serve a number of remote units 105 within a serving area, for example, a cell or a cell sector via a wireless communication link. The base units 125 may communicate directly with one or more of the remote units 105 via communication signals. Generally, the base units 125 transmit downlink ("DL") communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the base units 125.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a base unit 125. The non-3GPP access networks 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. A non-3GPP access network 130 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interface function 135. In one embodiment, the interface function 135 is a non-3GPP interworking function ("N3IWF"). In another embodiment, the interface function 135 is a trusted network gateway function ("TNGF") and/or a trusted WLAN interworking function ("TWIF"). In another embodiment, the interface function 135 is a 5G Residential Gateway ("5G-RG"). The interface function 135 provides interworking between a non-3GPP AN 120 and the mobile core network 140, supporting connectivity via the "N2" and "N3" interfaces. As depicted, both the 3GPP access network 120 and the interface function 135 communicate with the AMF 145 using a "N2" interface and with the UPFs 141, 142 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. While the interface function 135 is depicted as being located outside both the non-3GPP access network 130 and the core network 140, in other embodiments the interface function 135 may be co-located with the non-3GPP access network 130 (e.g., if the non-3GPP access network 130 is a trusted non-3GPP access network) or located within the core network 140.

In one embodiment, the mobile core network 140 is a 5G core ("5GC") or the evolved packet core ("EPC"), which may be coupled to another data network 150, like the Internet and private data networks, among other data networks. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes a first UPF 141 that serves a 3GPP access network 120, a second UPF 142 that serves a non-3GPP access network 130, and an anchor UPF ("UPF-A") 143. In other embodiments, the 3GPP access network 120 and non-3GPP access network 130 may connect directly to the UPF-A 143 (e.g., without the need for the UPF-1 141 and UPF-2 142).

The mobile core network 140 also includes multiple control plane functions including, but not limited to, an Access and Mobility Management Function ("AW") 145, a Session Management Function ("SMF") 146, a Policy Control Function ("PCF") 148, and a Unified Data Management function ("UDM") 149. Although specific numbers and types of network functions are depicted in FIG. 1, one of skill in the art will recognize that any number and type of network functions may be included in the mobile core network 140.

As depicted, a remote unit 105 may be connected to both a base unit 125 in a 3GPP access network 120 and a base unit (not shown in FIG. 1) in a non-3GPP access network 130. The remote unit 105 may transmit a request to establish a data connection over one of the 3GPP access network 120 and the non-3GPP access network 130. In some embodiments, the request includes an indication that a multi-access data connection is to be established (e.g., a UE-initiated multi-access data connection). For example, the remote unit 105 may indicate that a multi-access data connection is to be established by including a first session identifier (e.g., associated with the 3GPP access network 120) and a second session identifier (e.g., associated with the non-3GPP access network 130) in the establishment request. As another example, the remote unit 105 may indicate that a multi-access data connection is to be established by including a session identifier and a multi-access parameter in the request. In other embodiments, the request does not include an indication that a multi-access data connection is to be established (i.e., it is a request for a single-access data connection) but the SMF 146 receiving the request determines to create a multi-access data connection (e.g., a network-initiated multi-access data connection).

After receiving the request to establish a data connection, the SMF 146 initiates the multi-access data connection by triggering the establishment of a data path (e.g., a child PDU session) over the non-3GPP access network 130 and triggering the establishment of another data path (e.g., another child PDU session) over the 3GPP access network 120. For example, the SMF 146 may trigger the establishment of a data path by sending a session management ("SM") request to the AMF 145, as described below with reference to FIGS. 5-7. Note that the multi-access data connection is anchored at a common UPF (e.g., the UPF-A 143).

Figure 2:
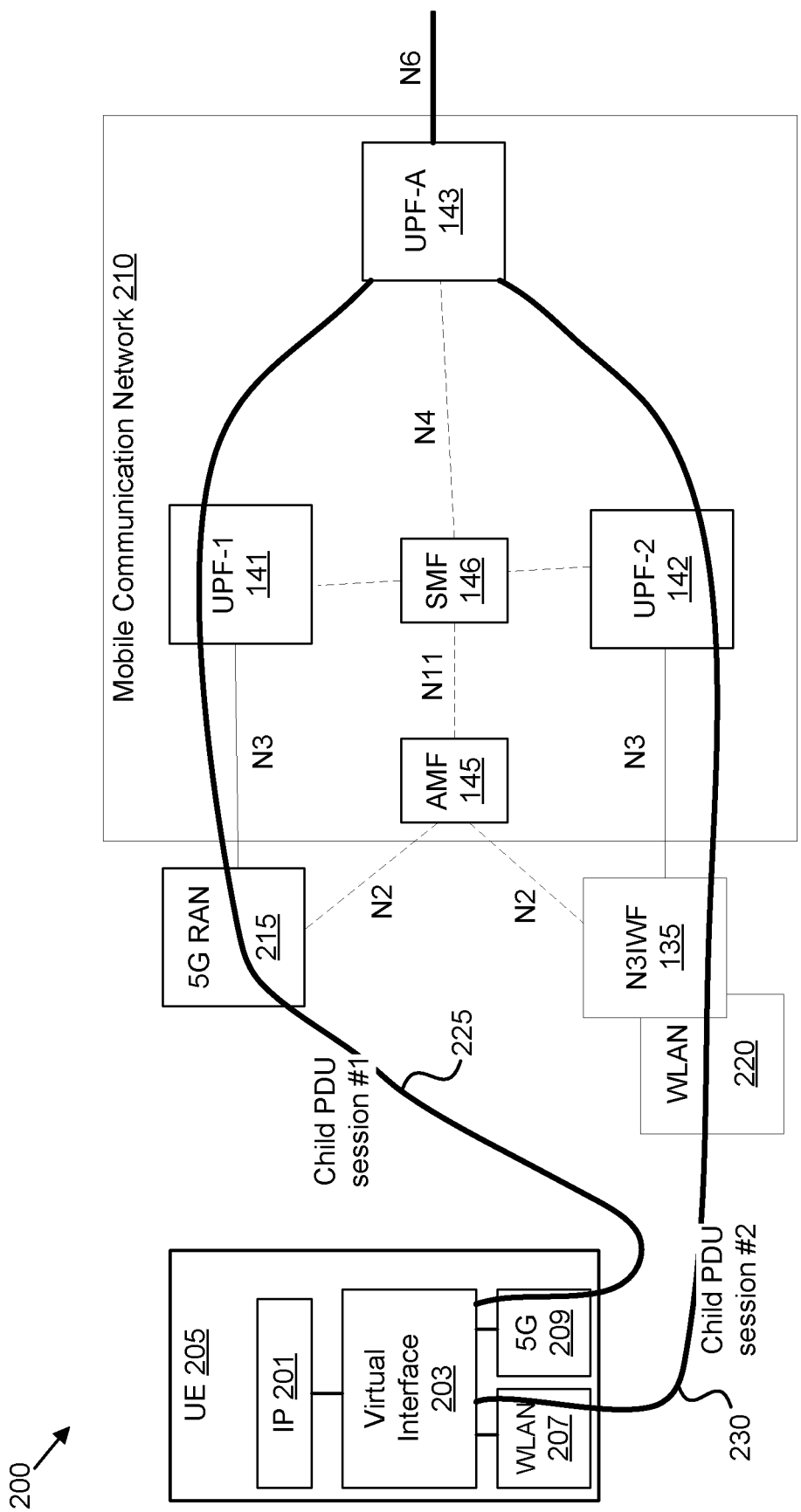
FIG. 2 is a block diagram illustrating one embodiment of a network architecture for establishing a multi-access data connection.

FIG. 2 depicts a network architecture 200 used for establishing a multi-access data connection, according to embodiments of the disclosure. The network architecture 200 may be a simplified embodiment of the wireless communication system 100. As depicted, the network architecture 200 includes a UE 205 that communicates with mobile communication network 210 over both a 5G RAN 215 and a WLAN 220, such as a Wi-Fi RAN. The 5G RAN 215 is one embodiment of the 3GPP access network 120 and the WLAN 220 is one embodiment of the non-3GPP access network 130, described above. The mobile communication network 210 is one embodiment of the core network 140, described above, and includes a first UPF 141, a second UPF 142, an anchor UPF 143, an AMF 145, and a SMF 146. The WLAN 220 accesses the mobile communication network via the interface function 135, which may be co-located with the WLAN 220, located in the mobile core network, or located outside both the WLAN 220 and the mobile core network, as described above. The interface function 135 communicates with the AMF 145 via an "N2" interface and with the second UPF 142 via an "N3" interface. The 5G RAN 215 communicates with the AMF 145 via an "N2" interface and with the first UPF 141 via an "N3" interface.

As depicted, the UE 205 includes a protocol stack containing an IP layer 201, a virtual interface layer 203, a WLAN interface 207, and a 5G radio interface 209. After sending the single request to establish a data connection (e.g., a MA-PDU session), as described herein, the UE 205 receives a request to set up a first data bearer for the data connection (corresponding to the first child PDU session 225) over the 5G RAN 215 and a request to set up a second data bearer for the data connection (corresponding to the second child PDU session 230) over the WLAN 220. The requests include one or more session identifiers included in the single request so that the UE 205 knows they are both for the same MA-PDU session.

Accordingly, the UE 205 establishes a multi-access data connection (here depicted as a MA-PDU session) that has two child PDU sessions: a first child PDU session 225 that utilizes the 5G radio interface 209 and the 5G RAN 215 and a second child PDU session 230 that utilizes the WLAN interface 207 and the WLAN 220 (e.g., a public Wi-Fi hotspot). The two child PDU sessions are linked in the UE in the "virtual interface" layer 203 which exposes a single IP interface to upper layers (e.g., the IP layer 201). Accordingly, the two child PDU sessions share the same IP address and compose a multi-link data connection between the UE 205 and the UPF-A 143. FIG. 2 shows a scenario with three UPFs: the first UPF 141 interfacing to 5G RAN 215, the second UPF 142 interfacing with interface function 135, and the anchor UPF 143. However, in other scenarios the UPFs 141, 142 may not be required, for example where it is possible to interface the anchor UPF 143 directly to the 5G RAN 215 and to the interface function 135.

In various embodiments, when the UE 205 receives a request from an internal application (or OS) to establish a data connection with certain parameters (e.g., certain DNN and/or Connection Capabilities) and there is no active PDU Session that matches these parameters, then the UE 205 decides to request a new PDU Session. The UE 205 executes the following steps to determine if it should request a single-access PDU (SA PDU) Session or a multi-access PDU (MA PDU) Session. These steps are based on TS 23.503.

First, the UE 205 evaluates the provisioned URSP rules (if any), excluding the "match-all" URSP rule, and attempts to find a URSP rule that matches the request from the app (a matching URSP rule). If the UE 205 finds a matching URSP rule, then the UE 205 applies this rule.

Figure 6:
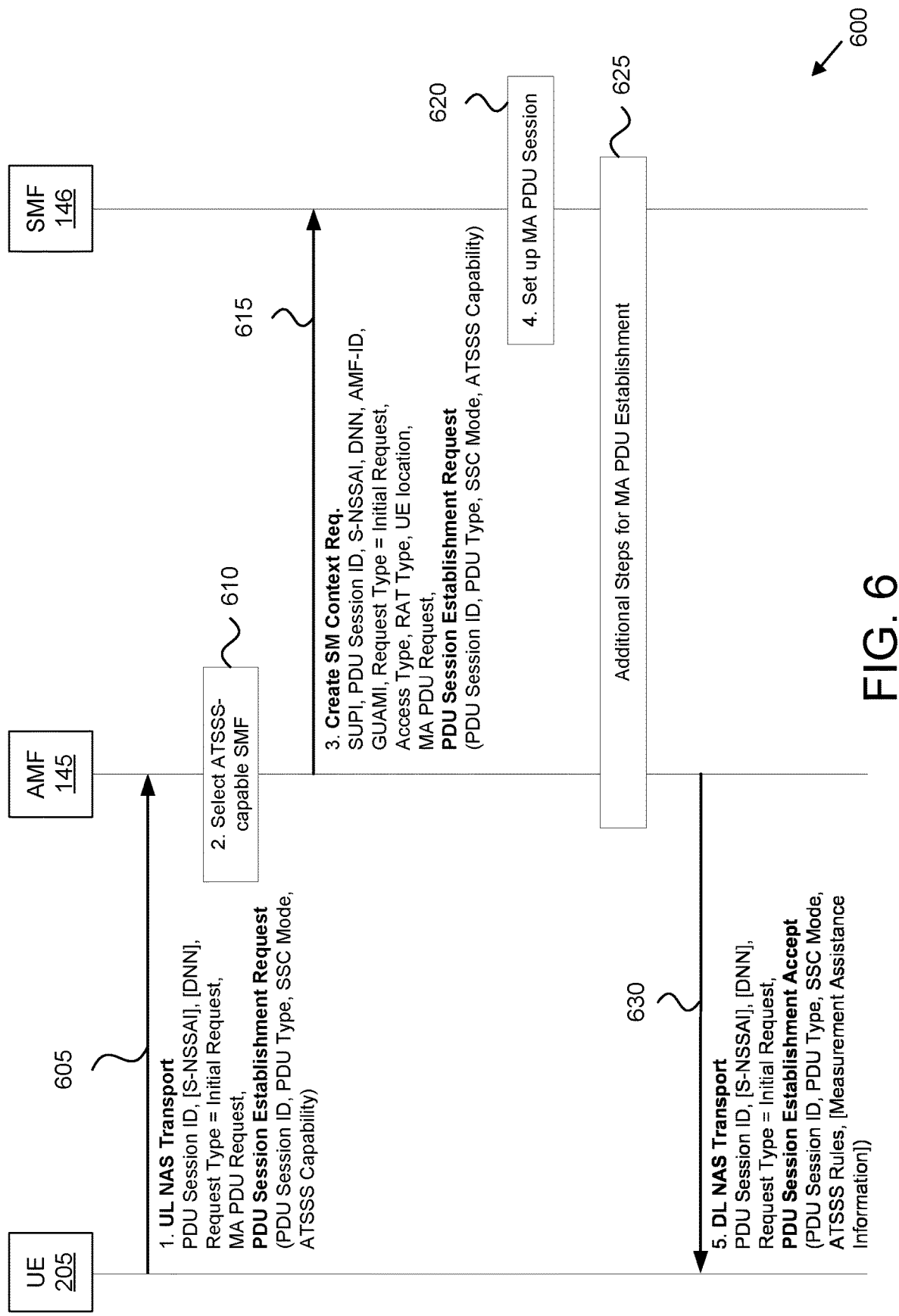
FIG. 6 is a block diagram illustrating one embodiment of a network procedure for establishing a MA PDU Session.
Figure 8:
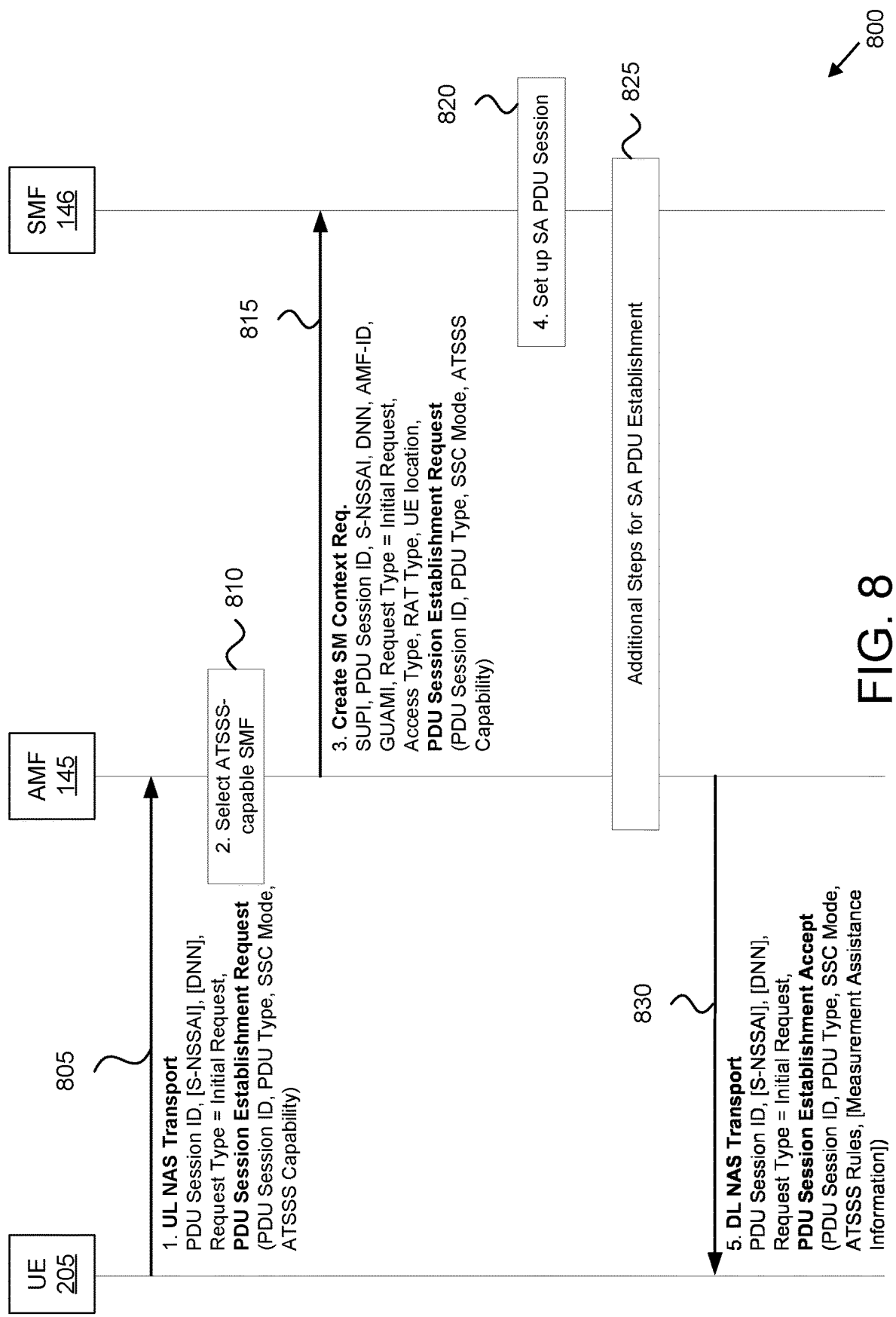
FIG. 8 is a block diagram illustrating one embodiment of a network procedure for establishing a MA PDU Session.

If the matching URSP rule indicates Access Type Preference=Multi-Access, then the UE 205 requests a MA PDU Session. FIG. 6 shows the scenario of the UE 205 requesting a MA PDU Session. If the matching URSP rule indicates "Access Type Preference=3GPP access" or "Access Type Preference=Non-3GPP access", then the UE 205 requests a SA PDU Session. FIG. 8 shows the scenario of the UE 205 requesting a SA PDU Session. Where the matching URSP rules indicates single access, then this SA PDU Session should not be converted by the 5GC network to a MA PDU Session because the UE 205 selected the access type based on policy in the UE.

Figure 7:
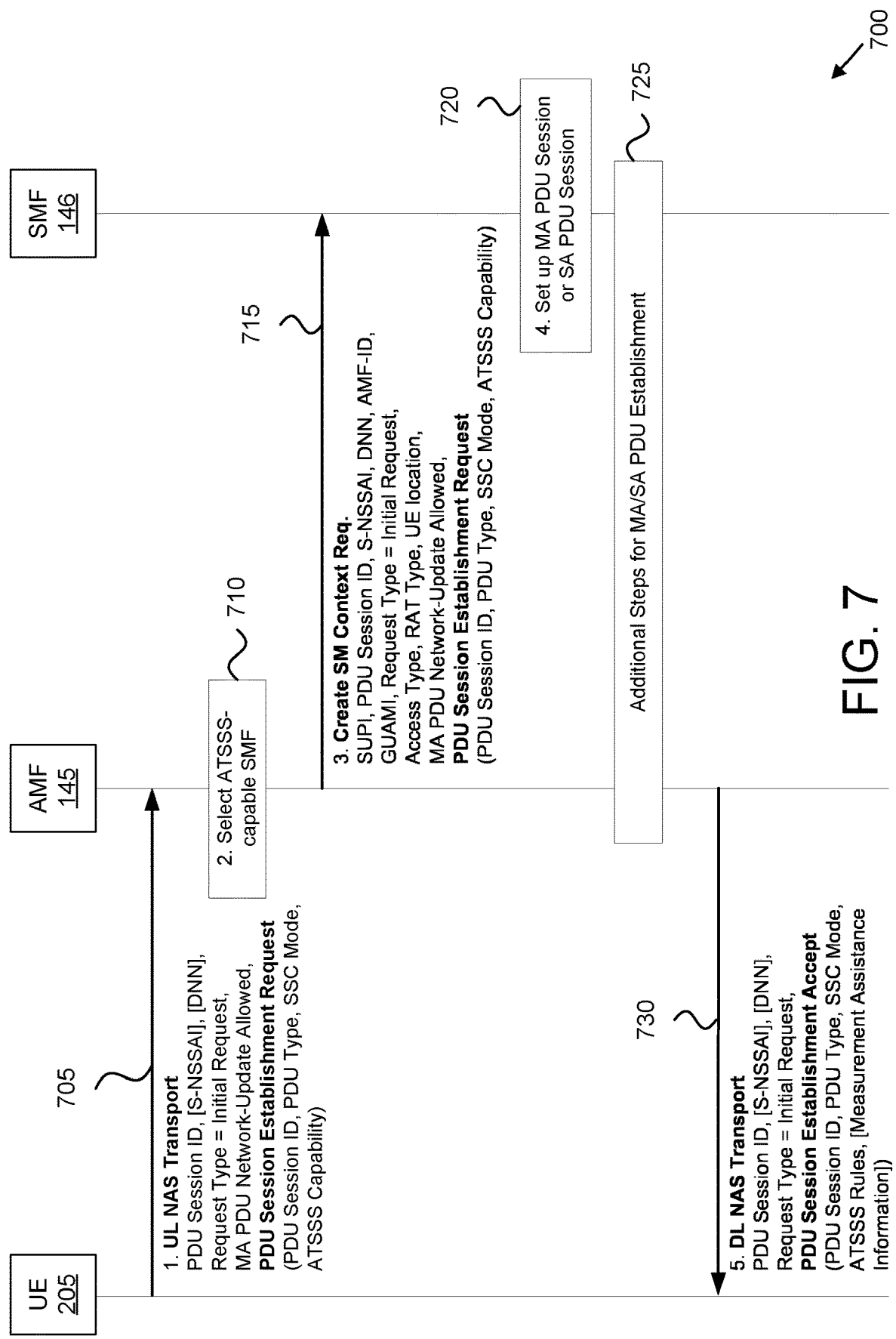
FIG. 7 is a block diagram illustrating one embodiment of a network procedure for establishing a MA PDU session when the UE does not request a multi-access data connection.

However, if the matching URSP rule does not indicate an Access Type Preference (which is an optional component), then the UE 205 selects its own access type, and it may request a SA PDU Session. Here, this SA PDU Session may be converted by the 5GC network to a MA PDU Session because no policy in the UE 205 mandates a single access. FIG. 7 shows the scenario of the UE 205 requesting a SA PDU Session that may be converted into a MA PDU Session.

If the UE 205 does not find a matching URSP rule, and the UE 205 has applicable Local Configuration (i.e., local configuration that matches the requested app), then the UE 205 applies its Local Configuration. If the applicable Local Configuration indicates preference for a MA PDU Session, then the UE 205 requests a MA PDU Session. FIG. 6 shows the scenario of the UE 205 requesting a MA PDU Session. If the applicable Local Configuration indicates preference for a specific access (3GPP or Non-3GPP), then the UE 205 requests a SA PDU Session. However, this SA PDU Session may be converted by the 5GC network to a MA PDU Session since no policy in the UE 205 mandates a single access. FIG. 7 shows the scenario of the UE 205 requesting a SA PDU Session that may be converted into a MA PDU Session.

If the applicable Local Configuration does not indicate an access preference, then the UE 205 considers the Access Type Preference in the "match-all" URSP rule, if present. If the UE 205 has no "match-all" URSP rule, or the "match-all" URSP rule does not contain an Access Type Preference, then the UE 205 selects its own access type and it may request a SA PDU Session. However, this SA PDU Session may be converted by the 5GC network to a MA PDU Session since no policy in the UE 205 mandates a single access. FIG. 7 shows the scenario of the UE 205 requesting a SA PDU Session that may be converted into a MA PDU Session.

If the UE 205 finds no matching URSP rule and has no applicable Local Configuration, or the UE 205 has applicable Local Configuration, but the PDU Session requested based on the applicable Local Configuration was rejected by the 5GC network, then the UE 205 applies the "match-all" URSP rule (if present). If the "match-all" URSP rule indicates Access Type Preference=Multi-Access, then the UE 205 requests a MA PDU Session. FIG. 6 shows the scenario of the UE 205 requesting a MA PDU Session. If the "match-all" URSP rule indicates Access Type Preference=3GPP or Non-3GPP access, then the UE 205 requests a SA PDU Session. This SA PDU Session should not be converted by the 5GC network to a MA PDU Session because the UE 205 selected the access type based on policy in the UE. FIG. 8 shows the scenario of the UE 205 requesting a SA PDU Session that is not to be converted into a MA PDU session.

If the "match-all" URSP rule does not indicate an Access Type Preference (which is an optional component), then the UE 205 selects its own access type, and it may request a SA PDU Session. However, this SA PDU Session may be converted by the 5GC network to a MA PDU Session since no policy in the UE 205 mandates a single access. FIG. 7 shows the scenario of the UE 205 requesting a SA PDU Session that may be converted into a MA PDU Session.

Additionally, if the UE 205 has no "match-all" URSP rule, then the UE 205 selects its own access type, and it may request a SA PDU Session. This SA PDU Session may be converted by the 5GC network to a MA PDU Session since no policy in the UE 205 mandates a single access. FIG. 7 shows the scenario of the UE 205 requesting a SA PDU Session that may be converted into a MA PDU Session.

Figure 3:
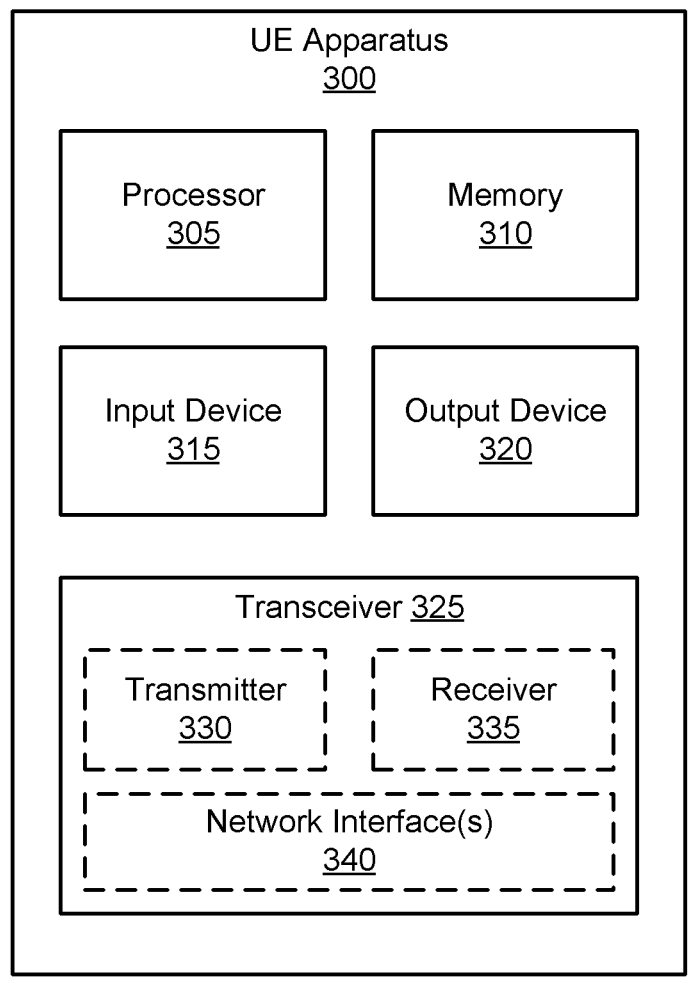
FIG. 3 is a schematic block diagram illustrating one embodiment of a UE apparatus for establishing a multi-access data connection.

FIG. 3 depicts one embodiment of a UE apparatus 300 that may be used for establishing a multi-access data connection, according to embodiments of the disclosure. The UE apparatus 300 may be one embodiment of the remote unit 105. Furthermore, the UE apparatus 300 may include a processor 305, a memory 310, an input device 315, a display 320, and a transceiver.

The transceiver 325 may include a first logical transceiver for communicating with a mobile communication network (e.g., the mobile core network 140) over a first access network, and a second logical transceiver for communicating with the mobile communication network over a second access network. The first and second access networks facilitate communication between the mobile core network 140 and the UE apparatus 300. In one embodiment, the first access network is the 5G RAN 215 or other 3GPP access network 120 and the second access network is the WLAN 220 or other non-3GPP access network 130. In another embodiment, the second access network is the 5G RAN 215 or other 3GPP access network 120 and the first access network is the WLAN 220 or other non-3GPP access network 130. In other embodiments, the first access network and second access network may be other types of access networks, the first access network being a different type of access network than the second.

As depicted, the transceiver 325 includes at least one transmitter 330 and at least one receiver 345. Additionally, the transceiver 325 may support at least one network interface 340. Here, the at least one network interface 340 facilitates communication with an eNB or gNB (e.g., using the "Uu" interface). Additionally, the at least one network interface 340 may include an interface used for communications with an UPF, an SMF, and/or a P-CSCF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 transmits a request to establish a data connection. In certain embodiments, the request to establish a data connection contains an indication to establish the data connection over both the first and the second access networks. In one embodiment, the indication to establish the data connection over both the first and the second access networks is (or includes) a first session identifier associated with the first access network and a second session identifier associated with the second access network. In another embodiment, the indication to establish the data connection over both the first and the second access networks is (or includes) a first session identifier and a multi-access parameter. Here, the first session identifier is associated to both the first access network and the second access network.

In some embodiments, the processor 305 transmits the request to establish a data connection over the second access network. Additionally, the request to establish a data connection contains a session identifier associated with the second access network and does not contain a session identifier associated with the first access network. In certain embodiments, the request to establish a data connection includes a mode parameter, the mode parameter containing a requested mode of operation for a multi-access data connection.

In certain embodiments, the first access network is an access network not defined by 3GPP ("non-3GPP access") and the second access network is an access network defined by 3GPP ("3GPP access"). In such embodiments, the request to establish a data connection may be a Packet Data Unit ("PDU") session request.

The processor 305 receives a first request to set up a first data bearer for the data connection over the first access network in response to the request also receives a second request to set up a second data bearer for the data connection over the second access network in response to the request. Here, both the first data bearer and the second data bearer are used to carry the traffic of the data connection.

In certain embodiments, the request to establish a data connection contains a session identifier associated with the second access network and does not contain an indication to establish the data connection over both the first and the second access networks. Further, the first request to set up a first data bearer for the data connection over the first access network and the second request to set up a second data bearer for the data connection over the second access network both include the session identifier associated with the second access network. In such embodiments, the processor 305 determines that the request over the second access network to establish a data connection has initiated the establishment of a multi-access data connection over the first access network and the second access network.

In various embodiments, the transceiver 325 is configured to communicate with a mobile communication network over at least one of: a first access network and a second access network. Note that before the establishment of the multi-access data connection, the transceiver 325 may use only one access network to communicate with the mobile communication network.

In various embodiments, the processor 305 transmits a request to establish a data connection. Here, the request may include a first indication requesting a single-access data connection and a second indication that an upgrade to the data connection is allowed. Moreover, the processor 305 receives (via the transceiver 325) an accept message associated with the request to establish a data connection. Here, the accept message contains a third indication that a multi-access data connection is to be established for carrying user-plane traffic over the first access network and the second access network. In one embodiment, the third indication is a set of one or more ATSSS rules which indicate to the processor 305 that the requested data connection (e.g., single-access PDU Session) was converted by the network to a multi-access data connection (e.g., converted to a MA-PDU Session).

Note that a multi-access PDU session may operate with one data path over one access only. The fact that it is multi-access, does not mean that it must always operate with multiple data paths. For example, when one access becomes unavailable, the multi-access PDU session simply uses the other access. At a later time, a second access may again become available and the multi-access PDU session may operate using multiple data paths (e.g., over multiple access networks). As another example, if one access network fails to meet a QoS requirement for the multi-access PDU session, then the multi-access PDU session may operate using only one access network until the second access network meets QoS requirements (e.g., until network conditions improve or QoS requirements change).

In some embodiments, the processor 305 examines local policy and local restrictions of the apparatus to determine whether a single-access data connection is mandated. In such embodiments, the processor 305 includes the second indication in response to determining that no local policy mandates a single-access data connection and that no local restriction mandates a single-access data connection. Note that this second indication is sent independently of whether the user equipment apparatus 300 is registered over one access or over both accesses.

In some embodiments, the processor 305 receives (via the transceiver 325) a request to set up a first data bearer for a multi-access data connection over the first access network and receives a request to set up a second data bearer for the multi-access data connection over the second access network. In such embodiments, both the first data bearer and the second data bearer are used to carry user-plane traffic of the multi-access data connection. In further embodiments, the request to establish a data connection may include a first session identifier, where the request to set up the first data bearer and the request to set up the second data bearer are each associated with the first session identifier.

In certain embodiments, the request to establish a data connection indicates an access traffic steering and splitting capability of the user equipment apparatus 300. In certain embodiments, the first access network is an access network not defined by 3GPP (i.e., "non-3GPP access") and the second access network is an access network defined by 3GPP (i.e., "3GPP access"), and where the request to establish a data connection is a PDU session establishment request.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to establishing a multi-access data connection, for example storing session identifiers, protocol stacks, security keys, messages, and the like. In some embodiments, the memory 310 also stores program code and related data, such as an operating system or other controller algorithms operating on the UE apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315. In certain embodiments, the UE apparatus 300 may not include any input device 315 and/or display 320.

As discussed above, the transceiver 325 communicates with one or more network functions of a mobile communication network via one or more access networks. The transceiver 325 operates under the control of the processor 305 to transmit messages, data, and other signals and also to receive messages, data, and other signals. For example, the processor 305 may selectively activate the transceiver 325 (or portions thereof) at particular times in order to send and/or receive messages. The transceiver 325 may include one or more transmitters 330 and one or more receivers 335. In certain embodiments, the one or more transmitters 330 and/or the one or more receivers 335 may share transceiver hardware and/or circuitry. For example, the one or more transmitters 330 and/or the one or more receivers 335 may share antenna(s), antenna tuner(s), amplifier(s), filter(s), oscillator(s), mixer(s), modulator/demodulator(s), power supply, and the like.

In various embodiments, the transceiver 325 is configured to communication with 3GPP access network(s) 120 and the non-3GPP access network(s) 130. In some embodiments, the transceiver 325 implements modem functionality for the 3GPP access network(s) 120 and/or the non-3GPP access network(s) 130. In one embodiment, the transceiver 325 implements multiple logical transceivers using different communication protocols or protocol stacks, while using common physical hardware. For example, the transceiver 325 may include one application-specific integrated circuit ("ASIC") which includes the function of first transceiver and second transceiver for accessing different networks. In other embodiments, the transceiver 325 comprises separate transceivers for the 3GPP access network(s) and for the non-3GPP access network(s).

Figure 4:
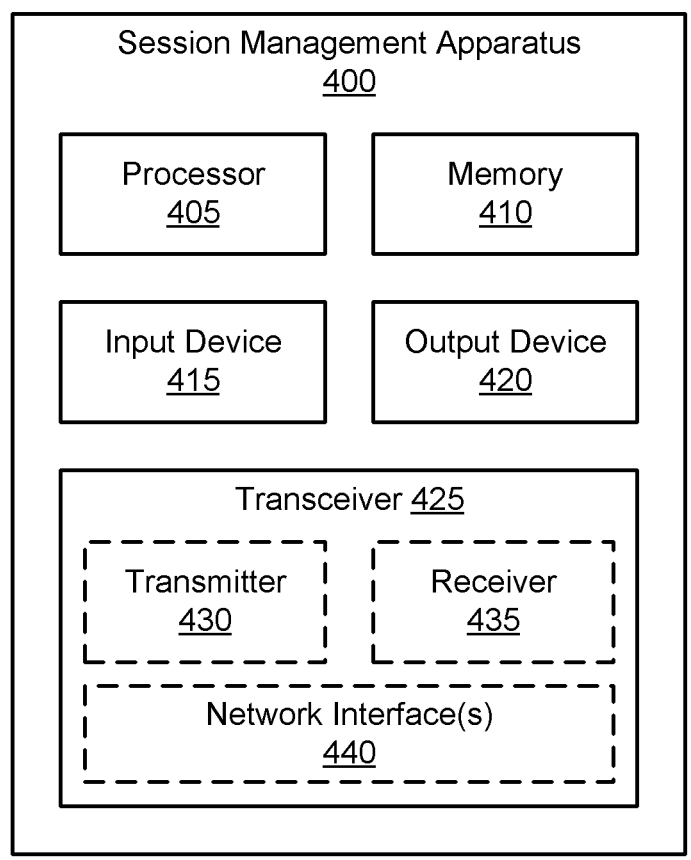
FIG. 4 is a schematic block diagram illustrating one embodiment of a session management apparatus for establishing a multi-access data connection.

FIG. 4 depicts one embodiment of a session management apparatus 400 that may be used for establishing a multi-access data connection, according to embodiments of the disclosure. The session management apparatus 400 may be one embodiment of the SMF 146. Furthermore, the session management apparatus 400 may include a processor 405, a memory 410, an input device 415, a display 420, and a transceiver 425. In some embodiments, the input device 415 and the display 420 are combined into a single device, such as a touchscreen. In certain embodiments, the session management apparatus 400 may not include any input device 415 and/or display 420.

As depicted, the transceiver 425 includes at least one transmitter 430 and at least one receiver 435. Additionally, the transceiver 425 may support at least one network interface 440 such as an "Na" interface used for communications between a UE and the session management apparatus 400. Here, the network interface 440 facilitates communication with a network function such as the AMF 145, PCF 148 and/or UDM 149. Additionally, the at least one network interface 440 may include an "N11" interface used for communications with an AMF, an "N4" interface used for communication with an UDM, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 receives a first session management ("SM") request via an access management function. Here, the first SM request contains a second SM request sent by a remote unit (e.g., the second SM request being embedded in the first SM request). The remote unit communicates with the mobile communication network over a first access network and a second access network and has simultaneous connections over both access networks. In one embodiment, the remote unit sends the second SM message over the first access network. In another embodiment, the remote unit sends the second SM message over the second access network. In one embodiment, the second SM message includes a mode parameter, the mode parameter containing a requested mode of operation for a multi-access data connection.

In response to the first session management request, the processor 405 sends a first request to the access management function to establish a first data path for a multi-access data connection over the first access network. In some embodiments, the processor 405 determines to form the multi-access data connection based on the contents of the first SM request. For example, the first SM request may include a multi-access parameter or a specific request for a multi-access data connection. As another example, the processor 405 may determine to form the multi-access data connection in response to a need to offload data traffic to a non-3GPP access network.

The processor 405 also sends a second request to the access management function to establish a second data path for the multi-access data connection over the second access network, in response to the first session management request, where both the first data path and the second data path are anchored at a common user plane network function in the mobile communication network. In some embodiments, establishment of the first and second data paths may occur simultaneously.

Where establishment is sequential, the first established data path (in time) is determined based on the access network used by the remote unit to send the second SM request. For example, where the second SM message is sent over the first access network, then the second data path over the second access network will be established prior to the first data path. As another example, where the second SM message is sent over the second access network, then the first data path over the first access network will be established prior to the second data path.

In some embodiments, the first session management request (e.g., received from the AMF) contains an indication to establish a multi-access data connection for the remote unit over both a first access network and a second access network. For example, indication to establish a multi-access data connection for the remote unit over both a first access network and a second access network may be a first session identifier associated with the first access network and a second session identifier associated with the second access network. As another example, the indication to establish a multi-access data connection for the remote unit over both a first access network and a second access network may be a multi-access parameter included with a (single) session identifier.

In certain embodiments, the processor 405 queries a policy control function for at least one of multi-access routing rules and multi-access QoS rules associated with the remote unit. Here, the multi-access QoS rules include QoS rules for the first access network and QoS rules for the second access network. The multi-access routing rules indicate how to route the traffic of the multi-access data connection across the first access network and the second access network. Additionally, the processor 405 may send a session establishment request to the common user plane function anchoring the first and second data paths, the session establishment request including the multi-access routing rules and an indication that the first and second data paths are for a multi-access data connection.

In some embodiments, the second session management request is a request from the remote unit to establish a data connection over a single access network. Additionally, the first session management request may include an indication that the remote unit has simultaneous connections to both the first access network and the second access network. In such embodiments, the processor 405 may determine to establish a multi-access data connection in response to receiving the first session management request (and the indication that the remote unit has simultaneous connections to both the first access network and the second access network).

In certain embodiments, the processor 405 further queries a data management function (e.g., the UDM 149) to determine whether a network subscription of the remote unit allows a multi-access connection in response to receiving the first session management request. In such embodiments, the processor 405 may determine to establish a multi-access data connection based on the network subscription of the remote unit. In certain embodiments, the processor 405 further queries a policy control function (e.g., the PCF 148) for at least one of multi-access routing rules and multi-access QoS rules associated with the requested data connection in response to receiving the first session management request, and where the processor determines to establish the multi-access data connection based on the at least one of multi-access routing rules and multi-access QoS rules received from the policy control function.

In some embodiments, the first access network is a non-3GPP access network (e.g., an access network not defined by 3GPP) and the second access network is a 3GPP network (e.g., an access network defined by 3GPP). Further, the second SM request (e.g., sent by the remote unit) may be a PDU session establishment request. In such embodiment, the sending the first request to the AMF to establish the first data path for the multi-access data connection may include the processor 405 sending a third SM request to the AMF without an embedded N1 Session Management container, the third SM request indicating that the AMF is to send it to the first access network.

Additionally, sending the second request to the AMF to establish the second data path for the multi-access data connection may include the processor 405 sending a response to the first SM request, where the response contains an embedded N1 Session Management container. Here, the embedded N1 Session Management container includes a response to the second SM message. Accordingly, the embedded N1 Session Management container is sent over the same access network used by the remote unit to send the second SM message. In one embodiment, the N1 Session Management container includes a PDU session establishment access message that contains multi-access routing rules and multi-access quality-of-service ("QoS") rules associated with the multi-access data connection.

In various embodiments, the processor 405 receives a first session management request via an AMF. Here, the first session management request contains: a second session management request sent by a UE, a first indication that the UE requests a single-access data connection and a second indication that the UE allows the network to upgrade the data connection. Moreover, the processor 405 controls the transceiver 425 to send a request to the AMF to establish a data path for each access network with which the UE is registered. Here, each data path is anchored at a common user plane network function in the mobile communication network.

For example, the UE may be registered with the first access network and the second access network. In this scenario, the processor 405 sends a first request to establish a data path over the first access network and sends a second request to establish a data path over the second access network. In certain embodiments, the UE may be currently registered with only the first access network. Here, the processor 405 sends a first request to establish a data path for a multi-access data connection (e.g., multi-access PDU session) over the first access network. Later, when the UE registers with the second access network, the processor 405 may send another request to establish a second data path (for the multi-access data connection) over the second access network.

The processor 405 determines whether to establish a multi-access data connection for the UE based on the second indication in the first session management request. Note that the multi-access data connection may be associated with a first access network and a second access network. In such embodiments, the processor 405 sends the request(s) to establish a data path for each access network with which the UE is registered in response to determining to establish the multi-access data connection.

In some embodiments, the processor 405 determines whether the UE is registered to the mobile communication network over the first access network and the second access network, e.g., based on a third indication received from the access management function. Note that the first request (from AMF to the network function 400) may include: a first indication showing that the UE requests a single-access data connection; a second indication showing that the UE allows the data connection to be upgraded to a multi-access data connection; and a third indication showing that the UE is registered to the mobile communication network over both the first access network and the second access network. In some embodiments, the first access network is an access network not defined by 3GPP (i.e., "non-3GPP access") and the second access network is an access network defined by 3GPP (i.e., "3GPP access"). In such embodiments, the second session management request may be a PDU session establishment request.

In some embodiments, the second session management request indicates an access traffic steering and splitting ("ATSSS") capability of the UE. In some embodiments, the processor 405 further sends a response to the UE in response to determining to establish a multi-access data connection, the response indicating establishment of the multi-access data connection. In one embodiment, the response includes a set of set of one or more ATSSS rules which indicate to the UE that the requested data connection (e.g., single-access PDU Session) was converted by the network to a multi-access data connection (e.g., converted to a MA-PDU Session).

In some embodiments, the second indication is provided in response to no policy in the UE mandating a single-access data connection and in response to no local restriction of the UE mandating a single-access data connection. In certain embodiments, the processor 405 further sends a query to a policy control function for policy rules with multi-access routing information and/or policy rules with multi-access quality-of-service ("QoS") information associated with the requested data connection in response to receiving the first session management request. In such embodiments, the query may contain the second indication. Moreover, the processor 405 may determine to establish the multi-access data connection based on the policy rules received from the policy control function (i.e., policy rules with multi-access routing information and/or policy rules with multi-access QoS information).

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to establishing a multi-access data connection, for example storing session identifiers associated with a remote unit, protocol stacks, messages, security keys, multi-access policy rules, and the like. In certain embodiments, the memory 410 also stores program code and related data, such as an operating system or other controller algorithms operating on the session management apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the base unit 125.

Figure 5A:
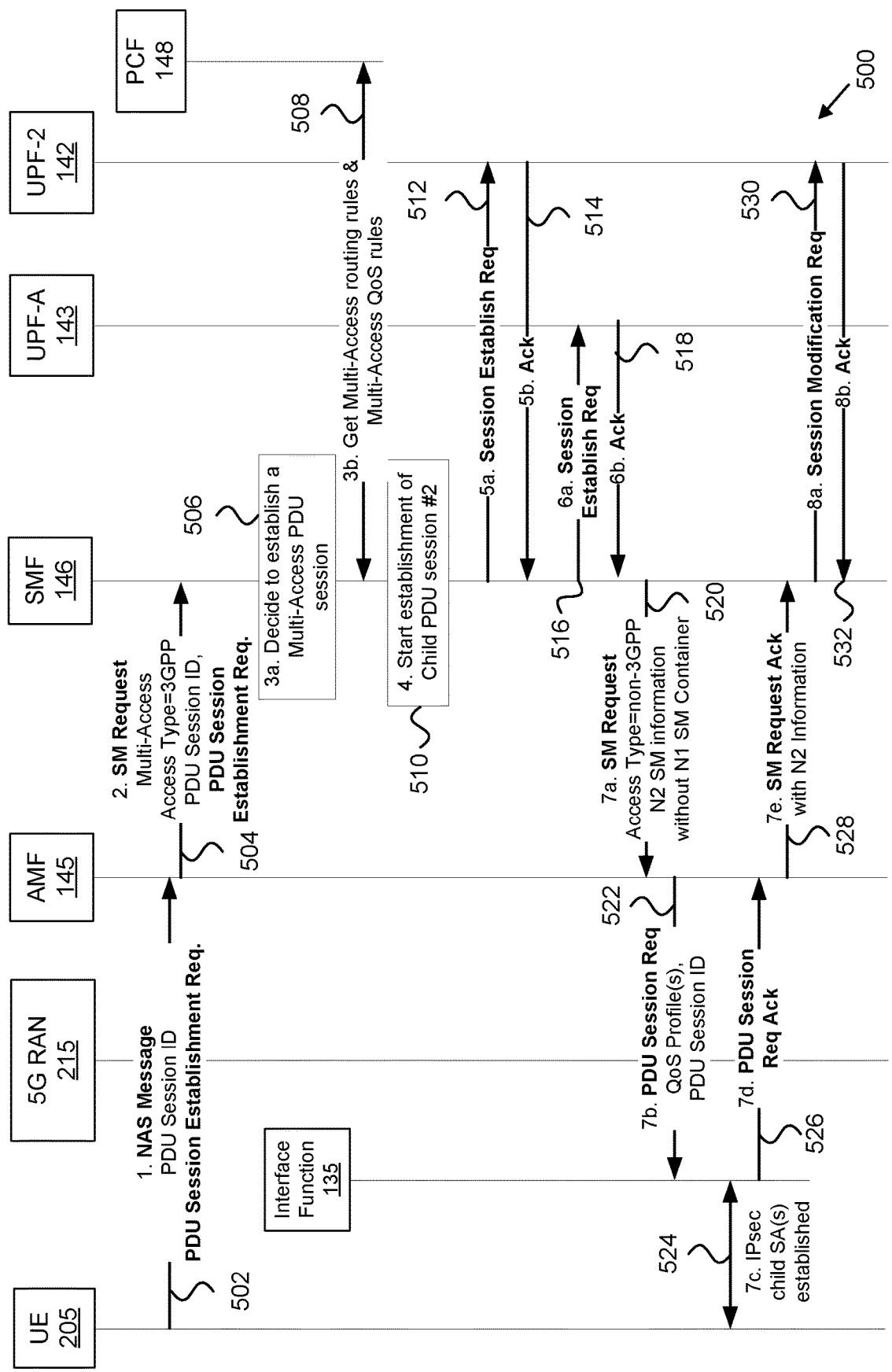
FIG. 5A is a block diagram illustrating one embodiment of a network procedure for establishing a multi-access data connection.
Figure 5B:
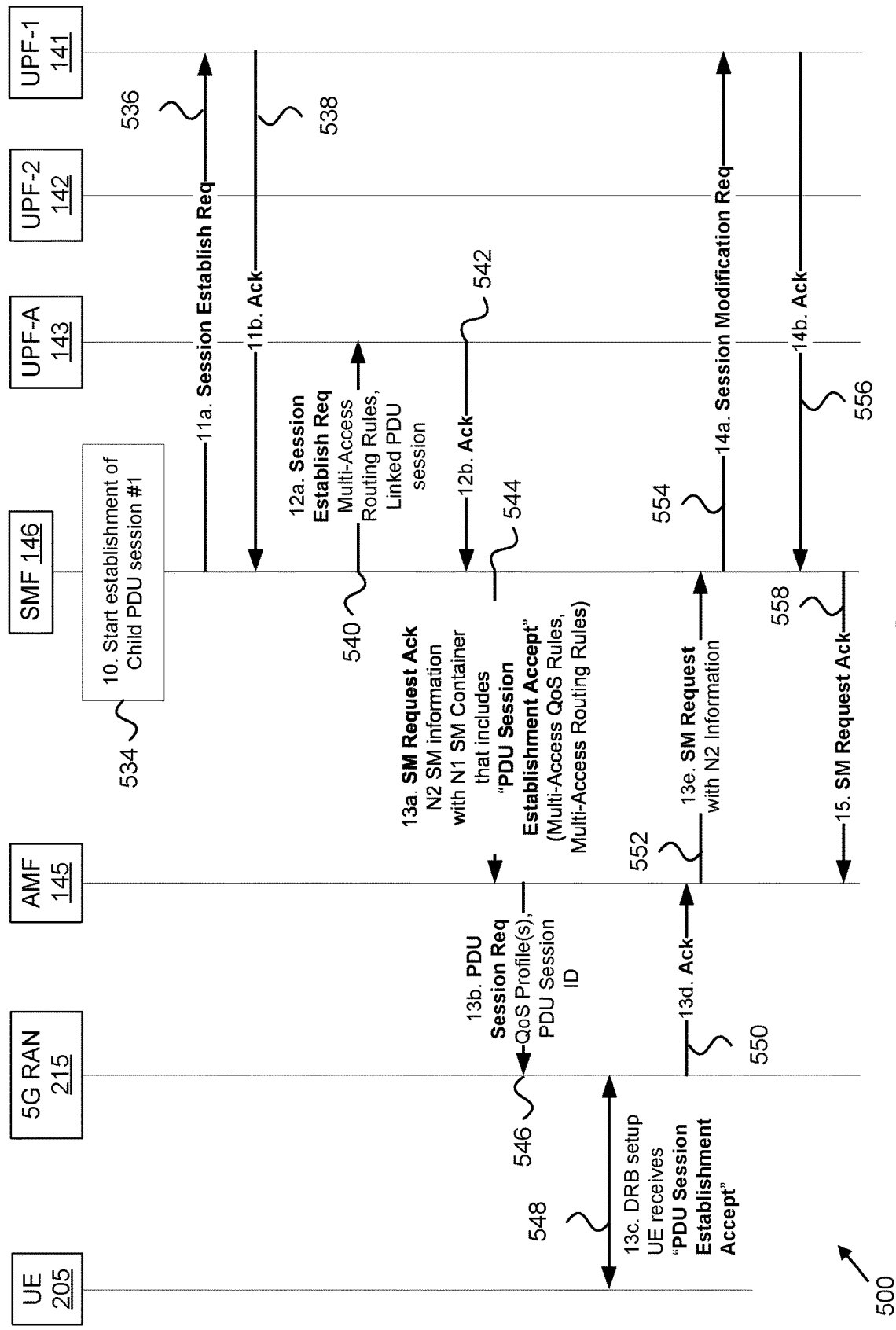
FIG. 5B is a continuation of the network procedure of FIG. 5A.

FIG. 5A-5B depict a network procedure 500 for establishing a multi-access data connection, according to embodiments of the disclosure. The network procedure 500 is a network-initiated procedure for establishing a multi-access data connection from a single request to establish a data connection. The network procedure involves the UE 205, the 5G RAN 215, the interface function 135, the AMF 145, the SMF 146, the first UPF 141, the second UPF 142, the anchor UPF 143, and the PCF 148. Here, the UE 205 is simultaneously connected to the mobile communication network via a 3GPP access network (here, the 5G RAN 215) and a non-3GPP access network (such as the WLAN 220).

The network procedure 500 begins and the UE 205 requests a normal (i.e., single-access network) PDU session (see operation 502). In the depicted embodiment, the NAS message is sent over the 5G RAN 215 (e.g., the 3GPP access network), but in other embodiments the NAS message may be sent over the non-3GPP access network. The NAS message includes a single PDU session identity, but does not contain any indication that the UE 205 wants to establish a multi-access PDU session. The NAS message sent by the UE 205 may also include other information, such as the requested DNN (Data Network Name), the requested slice type, etc.

Next, the AMF 145 selects an SMF 146 and sends the SM Request to the SMF 146 and includes the new Multi-access parameter to indicate to the SMF 146 that the UE 205 is connected both to 3GPP access network and to non-3GPP access network (704). The SM Request includes the "PDU Session Establishment Request" received from the UE 205. The SM Request further includes an Access Network Type parameter. Here, this parameter has the value "Access network Type=3GPP" to indicate to the SMF 146 that the PDU Session Establishment Request was received over 3GPP access network (e.g., the 5G RAN 215). Where the PDU Session Establishment Request is received over the non-3GPP access network, then a value "Access network Type=non-3GPP" is to be used.

Based on the Multi-access parameter and local information or policy, the SMF 146 decides to establish a MA-PDU session instead of the single-access network PDU session requested by the UE 205 (see operation 506). This decision may be made when the SMF 146 wants, e.g., to offload some of the data traffic of the requested PDU session to non-3GPP access network. For example, when the UE 205 requests in operation 502 to establish a PDU session over 3GPP access network to the Internet DNN (Data Network Name), the SMF 146 may decide to establish a MA-PDU session to the Internet DNN so that some Internet traffic can be offloaded to non-3GPP access network.

Before taking this decision, the SMF 146 may interact with the UDM 149 to determine if the UE 205's subscription allows the establishment of an MA-PDU session to the requested DNN. In addition, the SMF 146 may decide to establish an MA-PDU session based on information retrieved from the PCF 148 in operation 508. In this case, the decision to establish a MA-PDU session (e.g., operation 506) is taken after operation 508.

As discussed, the SMF 146 interacts with the PCF 148 (e.g., establishes a new PDU-CAN session) and may retrieve multi-access routing rules that should be applied at the UE 205 and at the anchor UPF 143 in order to determine how to route uplink and downlink traffic respectively across the two child PDU sessions (see operation 508). The SMF 146 may also retrieve from PCF multi-access QoS rules, i.e., QoS rules that should be applied over 3GPP access network and QoS rules that should be applied over non-3GPP access network.

Next, the SMF 146 begins to establish the child PDU session #2 over non-3GPP access network (see operation 510). Here, the SMF 146 sends a Session Establishment Request (see operation 512) to the second UPF 142 (serving the interface function 135) and receives an acknowledgement in response (see operation 514). The SMF 146 also sends a Session Establishment Request (see operation 516) to the anchor UPF 143 and receives an acknowledgement in response (see operation 518).

Next, the SMF 146 sends an SM Request to the AMF 145 (see operation 520) with a new parameter "Access network type=non-3GPP" to indicate to the AMF 145 that the included N2 SM Information should be sent to the non-3GPP access network (and not to the 3GPP access network where the "PDU Session Establishment Request" was received from). Note that this SM Request message does not contain a NAS message for the UE 205 (there is no N1 SM Container). This is because the SM Request message is not a response to the AMF's earlier SM request (e.g., the UE-initiated request), but it is rather a new SM Request initiated by the SMF 146.

The AMF 145 sends to the interface function 135 the QoS profile(s) to be applied over non-3GPP access network, each one determined from the QoS rules to be applied over non-3GPP access network, provided by PCF (see operation 522). Additionally, the interface function 135 receives the single PDU session ID that was provided by the UE 205 in step 1.

Next, the UE 205 and the interface function 135 establish one or more child IPsec SAs (see operation 524). Based on the received PDU Session ID the UE 205 determines that these child IPsec SAs are part of the PDU session requested in operation 502. In other words, the UE 205 determines that the network has decided to establish a MA-PDU session instead of the requested single-access network PDU session. The interface function 135 then sends a PDU Session Request Acknowledgment message to the AMF 145 (see operation 526) and the AMF 145 sends a SM Request Acknowledgment message to the SMF 146 (see operation 528). The SMF 146 also sends a Session Modification Request to the second UPF 142 (see operation 530) and receives an Acknowledgment message in response (see operation 532).

Continuing at FIG. 5B, the SMF 146 begins the establishment of the user-plane for the child PDU session #1 over 3GPP (e.g., the first child PDU session 225), which utilizes 3GPP access network (see operation 534). Here, the SA/IF 146 sends a Session Establishment Request (see operation 536) to the first UPF 141 (serving the 5G RAN 215) and receives an acknowledgement in response (see operation 538). The SA/IF 146 also sends a second Session Establishment Request to the anchor UPF 143 (see operation 540) and receives a second acknowledgement in response (see operation 542).

Next, the SMF 146 sends an SM Request Acknowledgment message to the AMF 145 (see operation 544) to respond to the SM Request in operation 504. The SM Request Acknowledgment message includes N2 SM information for the 5G RAN 215 and an N1 SM Container that includes a NAS "PDU Session Establishment Accept" message. Here, the NAS "PDU Session Establishment Accept" message contains (a) the multi-access QoS rules and (b) the multi-access routing rules to be applied by the UE 205. In certain embodiments, the "PDU Session Establishment Accept" message may include a mode parameter that indicates the negotiated mode of operation of the MA-PDU session. This mode may be the same as or different from the mode requested by the UE 205. For example, the UE 205 may request active/standby mode with the "active" child being the child PDU session over the non-3GPP access network, but the network may decide to change the "active" child to the child PDU session over the 3GPP access network.

The AMF 145 sends the N2 SM Information as a PDU Session Request message to the 5G RAN 215 (see operation 546). The PDU Session Request message includes the QoS profile(s) to be applied over the 5G RAN 215 (e.g., the 3GPP access network), each profile determined from the QoS rules to be applied over the 3GPP access network, as provided by the PCF 148 in operation 506. Also, the 5G RAN 215 receives the single PDU Session ID that was provided by the UE 205.

In response, the 5G RAN 215 sends a NAS "PDU session Establishment Accept" message to the UE 205 (see operation 548). Also, the 5G RAN 215 and UE 205 establish one or more Data Radio Bearers (DRBs), each DRB associated with one or multiple QoS rules (e.g., for transferring the traffic matching these QoS rules). Each DRB carries one or multiple QoS flows for the child PDU session over the 3GPP access network (e.g., the first child PDU session 225). Each QoS flow is associated with a QoS profile sent to the 5G RAN 215.

The 5G RAN 215 then sends an Acknowledgment message to the AMF 145 (see operation 550) and the AMF 145 sends a SM Request message with N2 information to the SMF 146 (see operation 552). The SMF 146 then send a Session Modification Request to the first UPF 141 (see operation 554) and receives an Acknowledgment message in response (see operation 556). The SMF 146 procedure sends a SM Request Acknowledgment message to the AMF 145 (see operation 558) and the network procedure 500 ends.

Note that the DRBs established over the 3GPP access network (e.g., the 5G RAN 215) serve the same purpose of the child IPsec SAs established over non-3GPP access network: they both provide multiple communication bearers with different QoS characteristics. While FIGS. 5A-B show sequential establishment of the child PDU sessions, in other embodiments the two child PDU session are established in parallel. Also note that because a single PDU session identity is shared by the child PDU sessions, whenever the UE 205 or the network wants to perform an operation on a child PDU session (e.g., the change the QoS rules of the child PDU session #2), both the PDU session identity and the corresponding access network type are to be provided in order to identify the appropriate child PDU session.

FIG. 6 depicts a procedure 600 for establishing a multi-access data connection, such as a MA PDU session, according to embodiments of the disclosure. The procedure 600 involved the UE 205, the AMF 145, and the SMF 146. The procedure 600 may be invoked when an ATSSS-capable UE requests a MA PDU Session. Here, it is assumed that the ATSSS-capable UE supports multi-access data connections (e.g., is capable of establishing a multi-access PDU session) and has simultaneous connections to two ANs (e.g., a 3GPP AN 120 and a non-3GPP AN 130).

The procedure 600 begins with the UE 205 sending a NAS message 605 (e.g., UL NAS Transport message) to an AMF (here the AMF 145) via an access network. As depicted, the NAS message 605 includes several components, including a PDU Session ID, a MA PDU request parameter, and a PDU Session Establishment Request message. Here, the NAS message 605 indicates that the Request Type is an Initial Request. In some embodiments, the NAS message includes additional parameters, such as network slice indication (e.g., S-NSSAI), data network indication (e.g., DNN), and the like.

As depicted, the PDU Session Establishment Request includes several components, including the PDU Session ID, a PDU Type, and an SCC Mode. The PDU Session Establishment Request may also include a UE capability indicator, such as the depicted Access Traffic Steering, Splitting and Switching (ATSSS) capability indicating the capabilities of the UE 205 relating to traffic splitting, access network switching, etc. In various embodiments, the format and contents of the NAS message 605 conform with 3GPP TS 23.501 and TS 23.502.

Upon receiving the NAS message 605, the AMF 145 selects an ATSSS-capable SMF (here the SMF 146) (see operation 610). Additionally, the AMF 145 sends an SM message 615 (e.g., Create SM Context Request message) to the selected SMF 146. As depicted, the SM message 615 includes several components, including a SUPI of the UE 205, the PDU Session ID, the S-NSSAI, DNN, the AMF-ID of the AMF 145, a GUAMI—Globally Unique AMF ID, an indication that the request type is an initial request, the access type, the RAT type, the UE location, a MA PDU request parameter, and the PDU Session Establishment Request. In various embodiments, the format and contents of the SM message 615 conform with 3GPP TS 23.501 and TS 23.502.

The SMF 146 determines to set up a multi-access (MA) PDU session in response to the SM message 615 (see operation 620). Here, the decision to establish the MA PDU session may be based on operator policy, subscription data, etc. The SMF 146 and AMF 145 also engage in additional steps to establish, e.g., user plane resources, the MA PDU session (see operation 625). These additional steps may be as described above and/or in 3GPP TS 23.502. Examples of such messaging are discussed above with reference to FIGS. 5A-5B.

The AMF 145 sends a NAS message 630 (e.g., DL NAS Transport message) to the UE 205. As depicted, the NAS message 630 includes several components, including the PDU Session ID and a PDU Session Establishment Accept message. Here, the NAS message 630 indicates that the Request Type is an Initial Request. In some embodiments, the NAS message includes additional parameters, such as network slice indication (e.g., S-NSSAI), data network indication (e.g., DNN), and the like.

As depicted, the PDU Session Establishment Accept message includes several components, including the PDU Session ID, a PDU Type, and an SCC Mode. The PDU Session Establishment Request also includes ATSSS rules for the MA PDU Session and may additionally include measurement assistance information. In various embodiments, the format and contents of the NAS message 630 conform with 3GPP TS 23.501 and TS 23.502.

FIG. 7 depicts a procedure 700 for establishing a multi-access data connection, such as a MA PDU session when the UE does not request a multi-access data connection, according to embodiments of the disclosure. The procedure 700 involves the UE 205, the AMF 145, and the SMF 146. The procedure 700 may be invoked when an ATSSS-capable UE requests a SA PDU Session, but neither policy nor local restrictions mandate single access.

For the procedure 700, it is assumed that the UE 205 has discretion to request either a SA PDU Session or a MA PDU Session, according to one or more of the scenarios discussed above. As an example, the UE 205 may decide to request a SA PDU Session because it does not know if the serving network supports ATSSS. When the UE 205 decides to request a SA PDU Session, without using a URSP rule to determine the type of access, the 5GC network may establish a MA PDU Session instead, if the 5GC network prefers so.

This will enable the 5G network to establish MA PDU Sessions more frequently, which in turn will enable the 5G network to optimize its operation and to improve the user experience by, e.g., offloading traffic to non-3GPP access; or load-balancing traffic over the two accesses; or aggregating the bandwidth of both accesses, etc. However, when the UE 205 decides to request a SA PDU Session due to a URSP rule that requires a single-access type, the 5GC network should not establish a MA PDU Session, as discussed above.

Accordingly, when an ATSSS-capable UE 205 requests a SA PDU Session, but no policy in the UE 205 and no local restrictions mandate a single access, the UE 205 provides a "MA PDU Network-Upgrade Allowed" indication and its ATSSS Capabilities. In this case, the 5GC network is allowed to establish a MA PDU Session, if the 5GC network prefers so. The "MA PDU Network-Upgrade Allowed" informs the 5GC network that, although a single-access PDU session is requested, it is allowed for the 5GC network to establish a multi-access PDU session instead. Note that this indicator may use other names or labels. The reception of ATSSS rules by the UE 205 is an indication that a MA PDU Session was established.

The procedure 700 begins with the UE 205 sending a NAS message 705 (e.g., UL NAS Transport message) to an AMF (here the AMF 145) via an access network. As depicted, the NAS message 705 includes several components, including a PDU Session ID, and a PDU Session Establishment Request message. Here, the NAS message 705 indicates that the Request Type is an Initial Request. In some embodiments, the NAS message includes additional parameters, such as network slice indication (e.g., S-NSSAI), data network indication (e.g., DNN), and the like.

The NAS message 705 includes an indicator that this PDU session can be converted (or not) to a MA PDU Session by network decision. As depicted, the NAS message 705 includes the parameter "MA PDU Network-Upgrade Allowed," however other equivalent indicators may be used.

As depicted, the PDU Session Establishment Request includes several components, including the PDU Session ID, a PDU Type, and an SCC Mode. The PDU Session Establishment Request may also include a UE capability indicator, such as the depicted Access Traffic Steering, Splitting and Switching (ATSSS) capability indicating the capabilities of the UE 205 relating to traffic splitting, access network switching, etc. In various embodiments, the format and contents of the NAS message 705 conform with 3GPP TS 23.501 and TS 23.502.

Upon receiving the NAS message 705, the AMF 145 determines whether the NAS message 705 includes the parameter "MA PDU Network-Upgrade Allowed" or equivalent indication. If so, the AMF 145 selects an ATSSS-capable SMF (here the SMF 146). Note that if the parameter "MA PDU Network-Upgrade Allowed" (or equivalent) is not received than an ATSSS-capable SMF is not required as discussed below with reference to FIG. 8. In the depicted embodiment, the NAS message 705 includes the parameter "MA PDU Network-Upgrade Allowed" (or equivalent) and so the AMF 145 selects the ATSSS-capable SMF 146 (see operation 710).

The AMF 145 sends an SM message 715 (e.g., Create SM Context Request message) to the selected SMF 146. As depicted, the SM message 715 includes several components, including a SUPI of the UE 205, the PDU Session ID, the S-NSSAI, DNN, the AMF-ID of the AMF 145, a GUAMI, an indication that the request type is an initial request, the access type, the RAT type, the UE location, and the PDU Session Establishment Request. In various embodiments, the format and contents of the SM message 715 conform with 3GPP TS 23.501 and TS 23.502. Like the NAS message 705, the SM message 715 includes the parameter "MA PDU Network-Upgrade Allowed" or equivalent indicator.

The SMF 146 determines whether to set up a single-access (SA) PDU session or a multi-access (MA) PDU session in response to the SM message 715 (see operation 720). In the depicted embodiment, it is assumed that the 5GC network decides to convert the single-access PDU Session requested by the UE 205 into a MA PDU Session. The SMF 146 may take this decision based on local operator policy and/or other conditions.

In certain embodiments, the SMF 146 indicates to a PCF that the SM policy control information is requested for a MA PDU Session. The SMF 146 and AMF 145 also engage in additional steps to establish, e.g., user plane resources, the MA PDU session (see operation 725). These additional steps may be as described above and/or in 3GPP TS 23.502.

The AMF 145 sends a NAS message 730 (e.g., DL NAS Transport message) to the UE 205. As depicted, the NAS message 730 includes several components, including the PDU Session ID and a PDU Session Establishment Accept message. Here, the NAS message 730 indicates that the Request Type is an Initial Request. In some embodiments, the NAS message includes additional parameters, such as network slice indication (e.g., S-NSSAI), data network indication (e.g., DNN), and the like.

The PDU Session Establishment Accept message includes ATSSS rules and indicates to the UE 205 that the requested single-access PDU session was established as a MA PDU Session. As depicted, the PDU Session Establishment Accept message includes several components, including the PDU Session ID, a PDU Type, and an SCC Mode. The PDU Session Establishment Request also includes ATSSS rules for the MA PDU Session and may additionally include measurement assistance information. In some embodiments, the reception of ATSSS rules by the UE 205 is an indication that a MA PDU Session was established. In various embodiments, the format and contents of the NAS message 730 conform with 3GPP TS 23.501 and TS 23.502.

Note that after the MA PDU Session is established over one access, the UE 205 may send another PDU Session Establishment Request over the other access containing a "MA PDU Request" indication and the same PDU Session ID that was provided over the first access.

FIG. 8 depicts a procedure 800 for establishing a multi-access data connection, such as a MA PDU session, according to embodiments of the disclosure. The procedure 800 involved the UE 205, the AMF 145, and the SMF 146. The procedure 800 may be invoked when an ATSSS-capable UE requests a SA PDU Session and either policy or local restrictions mandate single access, as discussed above.

The procedure 800 begins with the UE 205 sending a NAS message 805 (e.g., UL NAS Transport message) to an AMF (here the AMF 145) via an access network. As depicted, the NAS message 805 includes several components, including a PDU Session ID, and a PDU Session Establishment Request message. Here, the NAS message 805 indicates that the Request Type is an Initial Request. In some embodiments, the NAS message includes additional parameters, such as network slice indication (e.g., S-NSSAI), data network indication (e.g., DNN), and the like. As depicted, the PDU Session Establishment Request includes several components, including the PDU Session ID, a PDU Type, and an SCC Mode. In various embodiments, the format and contents of the NAS message 805 conform with 3GPP TS 23.501 and TS 23.502.

Note that the NAS message 805 does not include a MA PDU Request parameter or a MA PDU Allowed parameter. When an ATSSS-capable UE 205 requests a single-access PDU Session, but either policy in the UE 205 or local restrictions mandate a single access, the UE 205 does not provide a "MA PDU Network-Upgrade Allowed" indication or its ATSSS Capabilities. In this case, the 5GC network is not allowed to establish a MA PDU Session.

Upon receiving the NAS message 805, the AMF 145 selects an SMF (here the SMF 146) (see operation 810). Note that the selected SMF does not need to be ATSSS-capable. Additionally, the AMF 145 sends an SM message 815 (e.g., Create SM Context Request message) to the selected SMF 146. As depicted, the SM message 815 includes several components, including a SUPI of the UE 205, the PDU Session ID, the S-NSSAI, DNN, the AMF-ID of the AMF 145, a GUAMI, an indication that the request type is an initial request, the access type, the RAT type, the UE location, and the PDU Session Establishment Request. In various embodiments, the format and contents of the SM message 815 conform with 3GPP TS 23.501 and TS 23.502. Note that the SM message 815 does not include a MA PDU Request parameter or a MA PDU Allowed parameter.

The SMF 146 determines to set up a single-access (SA) PDU session in response to the SM message 815 (see operation 820). Here, the decision to establish the SA PDU session may be based on operator policy, subscription data, etc. The SMF 146 and AMF 145 also engage in additional steps to establish, e.g., user plane resources, the SA PDU session (see operation 825). These additional steps may be as described above and/or in 3GPP TS 23.502.

The AMF 145 sends a NAS message 830 (e.g., DL NAS Transport message) to the UE 205. As depicted, the NAS message 830 includes several components, including the PDU Session ID and a PDU Session Establishment Accept message. Here, the NAS message 830 indicates that the Request Type is an Initial Request. In some embodiments, the NAS message includes additional parameters, such as network slice indication (e.g., S-NSSAI), data network indication (e.g., DNN), and the like.

As depicted, the PDU Session Establishment Accept message includes several components, including the PDU Session ID, a PDU Type, and an SCC Mode. Because the established PDU session is not a MA PDU Session, the PDU Session Establishment Request does not includes ATSSS rules (or measurement assistance information). In various embodiments, the format and contents of the NAS message 830 conform with 3GPP TS 23.501 and TS 23.502.

Figure 9:
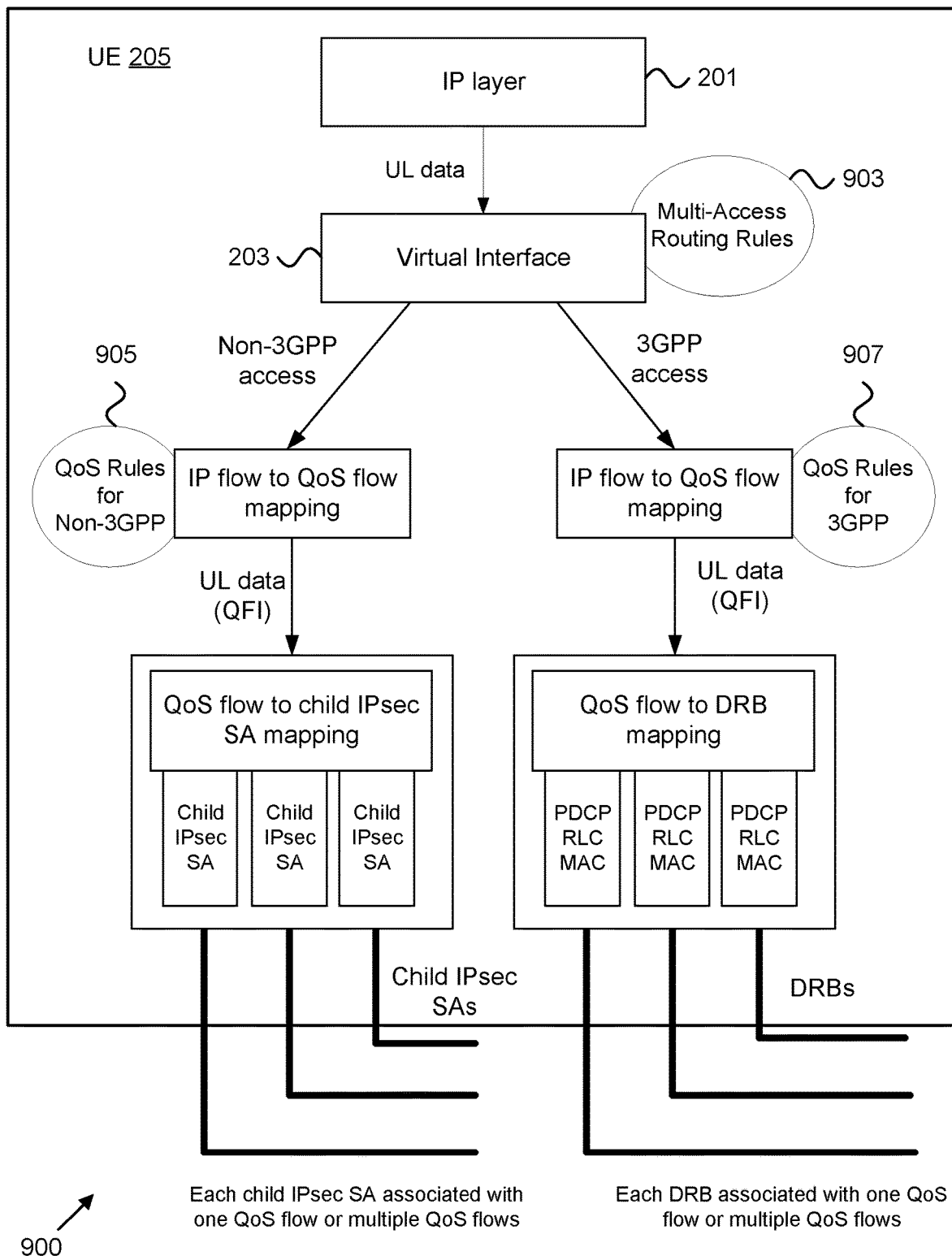
FIG. 9 is a block diagram illustrating one embodiment of a UE with a multi-access data connection.

FIG. 9 depicts a UE model 900, according to embodiments of the disclosure. The UE model 900 shows the UE 205 after the multi-access data connection (e.g., the MA-PDU session) is established. As depicted, the IP layer 201 generates an uplink data (UL data) packet which is passed to the virtual interface layer 203. As described above, the virtual interface layer 203 is a layer that exposes a single interface to the upper layers, e.g. a single IP interface to the IP layer 201 when the MA-PDU session is of IP type. The virtual interface layer 203 applies the multi-access routing rules 903 that were received during the establishment of the MA-PDU session and determines whether the UL data packet should be routed via the child PDU session over 3GPP access or via the child PDU session over non-3GPP access.

Each child PDU session has its own QoS rules (e.g., QoS rules for non-3GPP 905 and QoS rules for 3GPP 907), as shown in FIG. 9. The UL data packet routed to a child PDU session is first matched against a QoS rule and associated with the QoS Flow Identifier (QFI) of the matched QoS rule. Then, based on the associated QFI, it is routed to a corresponding DRB (for the 3GPP child PDU session) or to a corresponding child IPsec SA (for the non-3GPP PDU session).

Figure 10:
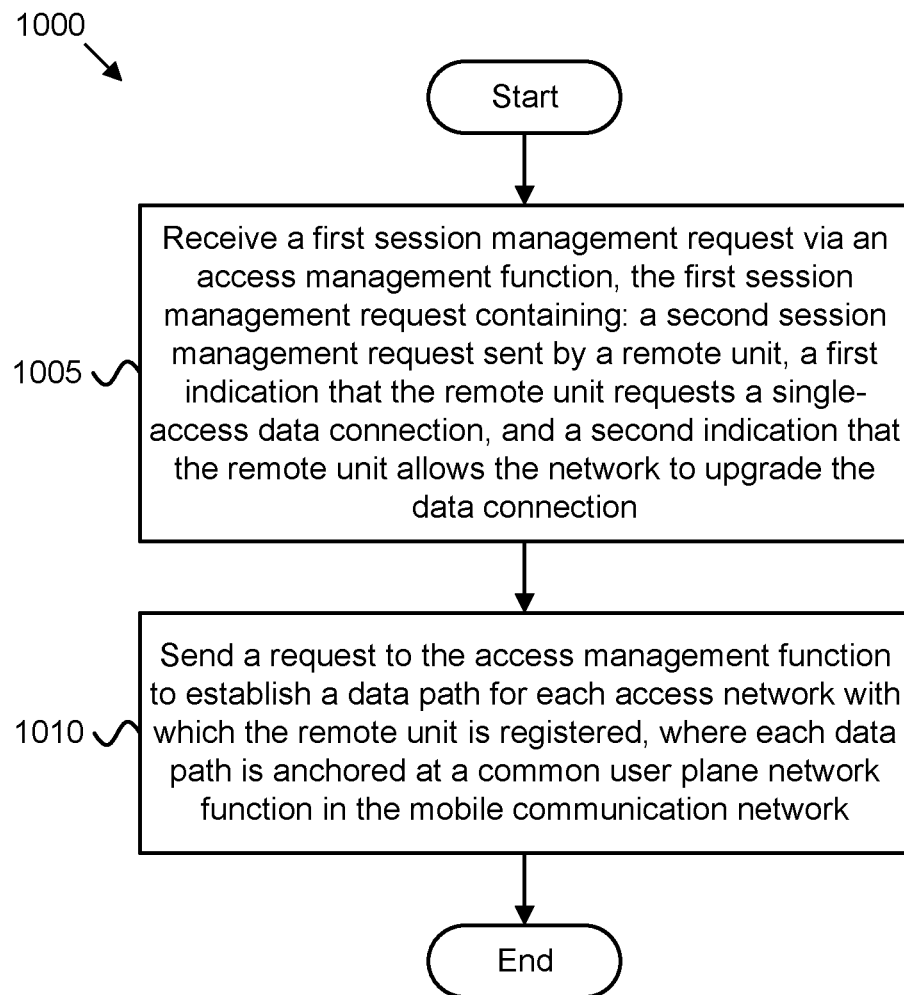
FIG. 10 is a schematic flow chart diagram illustrating one embodiment of a method for establishing a multi-access data connection.

FIG. 10 depicts a method 1000 for establishing a multi-access data connection, according to embodiments of the disclosure. In some embodiments, the method 1000 is performed by an apparatus, such as the SMF 106 and/or session management apparatus 400. In certain embodiments, the method 1000 may be performed by a processor executing program code, for example, a microcontroller, a microprocessor, a CPU, a GPU, an auxiliary processing unit, a FPGA, or the like.

The method 1000 begins with receiving 1005 a first session management request via an access management function. Here, the first session management request containing: a second session management request sent by a UE, a first indication that the UE requests a single-access data connection, and a second indication that the UE allows the network to upgrade the data connection.

The method 1000 includes sending 1010 a request to the access management function to establish a data path for each access network with which the UE is registered. Here, each data path is anchored at a common user plane network function in the mobile communication network. The method 1000 ends.

Figure 11:
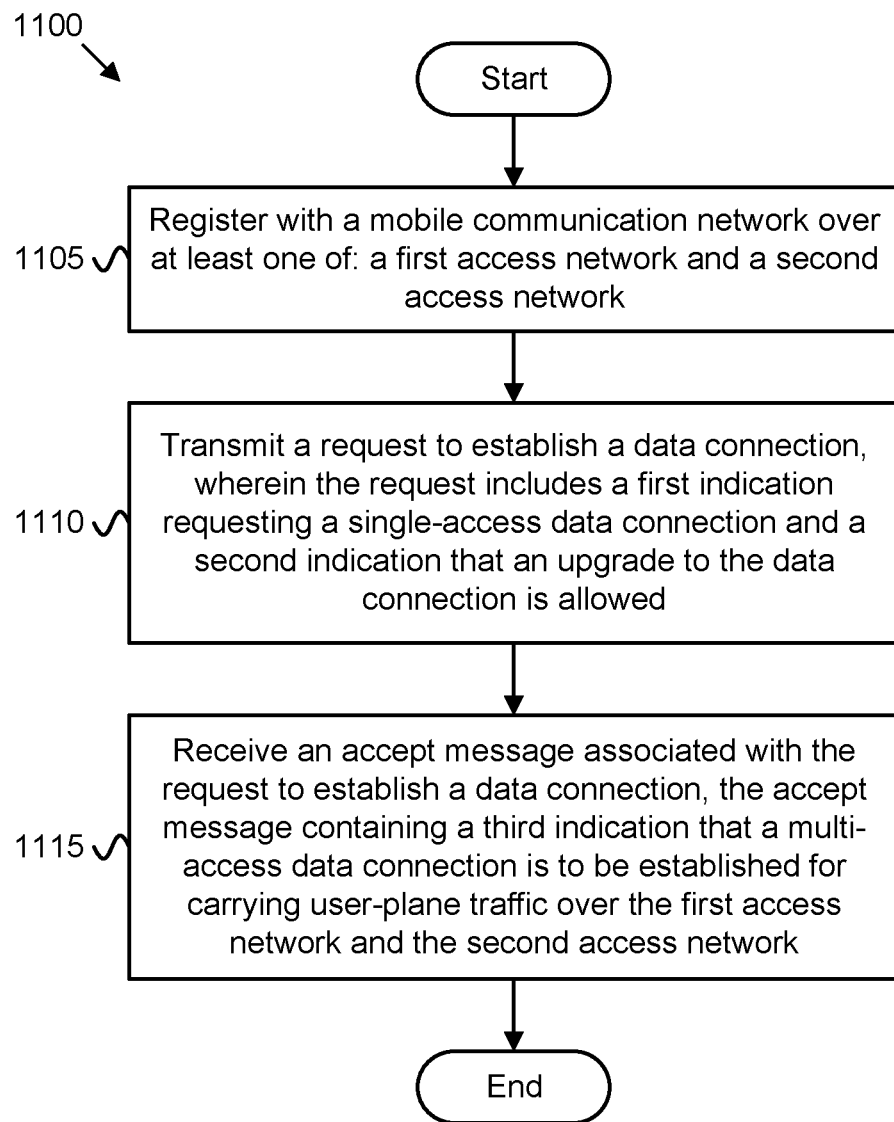
FIG. 11 is a schematic flow chart diagram illustrating another embodiment of a method for establishing a multi-access data connection.

FIG. 11 depicts a method 1100 for establishing a multi-access data connection, according to embodiments of the disclosure. In some embodiments, the method 1100 is performed by an apparatus, such as the remote unit 105, the UE 205, and/or the UE apparatus 300. In certain embodiments, the method 1100 may be performed by a processor executing program code, for example, a microcontroller, a microprocessor, a CPU, a GPU, an auxiliary processing unit, a FPGA, or the like.

The method 1100 begins with registering 1105 with a mobile communication network over at least one of: a first access network and a second access network. The method 1100 includes transmitting 1110 a request to establish a data connection. Here, the request includes a first indication requesting a single-access data connection and a second indication that an upgrade to the data connection is allowed.

The method 1100 includes receiving 1115 an accept message associated with the request to establish a data connection. Here, the accept message contains an indication that a multi-access data connection is to be established for carrying user-plane traffic over the first access network and/or the second access network. The method 1100 ends.

Figure 12:
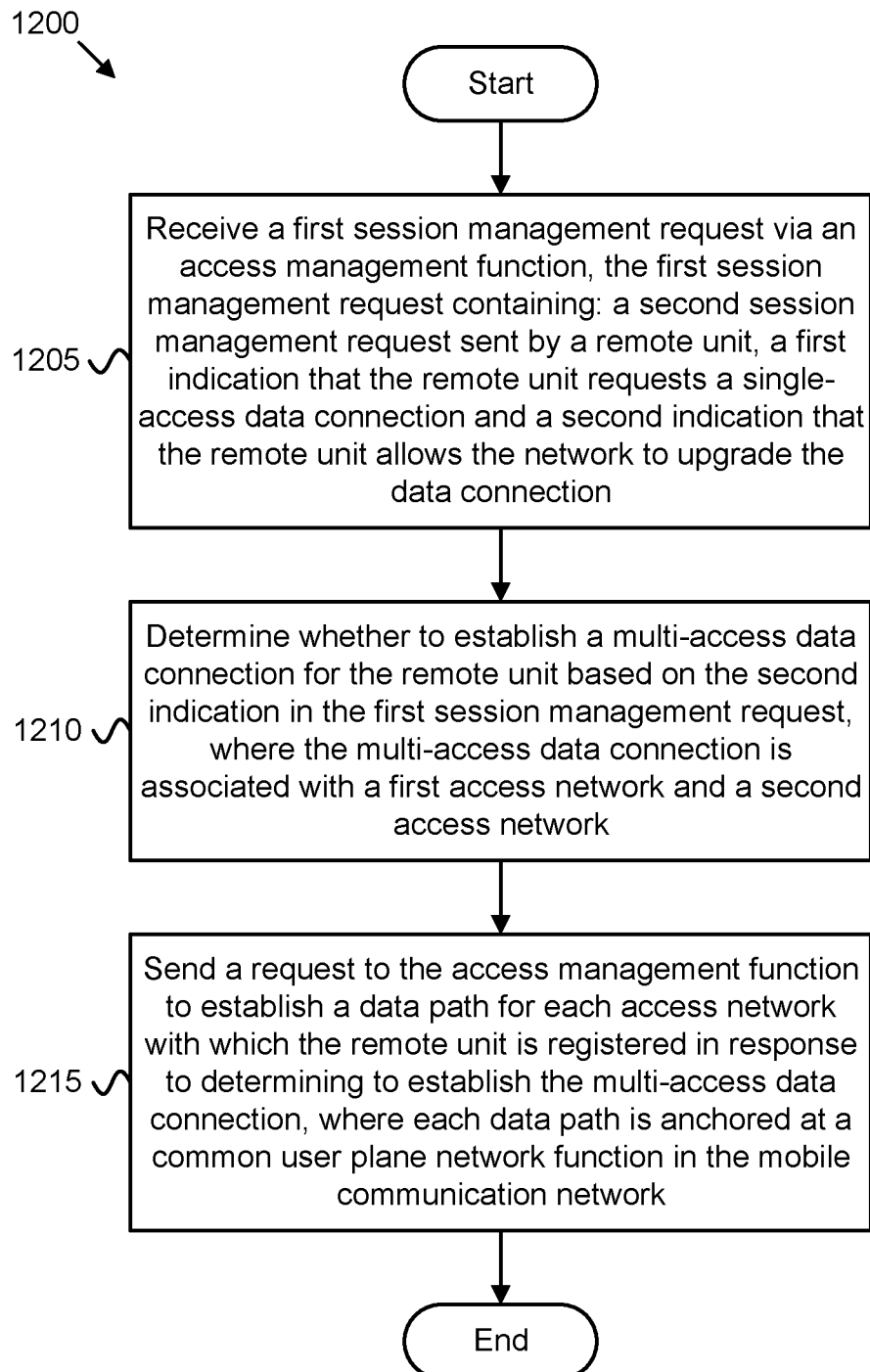
FIG. 12 is a schematic flow chart diagram illustrating a third embodiment of a method for establishing a multi-access data connection.

FIG. 12 depicts a method 1200 for establishing a multi-access data connection, according to embodiments of the disclosure. In some embodiments, the method 1200 is performed by an apparatus, such as the SMF 106 and/or session management apparatus 400. In certain embodiments, the method 1200 may be performed by a processor executing program code, for example, a microcontroller, a microprocessor, a CPU, a GPU, an auxiliary processing unit, a FPGA, or the like.

The method 1200 begins with receiving 1205 a first session management request via an access management function. Here, the first session management request containing: a second session management request sent by a UE, a first indication that the UE requests a single-access data connection, and a second indication that the UE allows the network to upgrade the data connection.

The method 1200 includes determining 1210 whether to establish a multi-access data connection for the UE based on the second indication in the first session management request. Here, the multi-access data connection is associated with the first access network and the second access network.

The method 1200 includes sending 1215 a request to the access management function to establish a data path for each access network with which the UE is registered in response to determining to establish the multi-access data connection. Here, each data path is anchored at a common user plane network function in the mobile communication network. The method 1200 ends.

Disclosed herein is a first apparatus for establishing a multi-access data connection, according to embodiments of the disclosure. The first apparatus may be implemented by a network function, such as the SMF 146 and/or session management apparatus 400. The first apparatus includes a processor and a transceiver that communicates with one or more network functions in a mobile communication network. The processor receives a first session management request via an access management function. Here, the first session management request contains: a second session management request sent by a remote unit, a first indication that the remote unit requests a single-access data connection, and a second indication that the remote unit allows the network to upgrade the data connection. The processor controls the transceiver to send a request to the access management function to establish a data path for each access network with which the remote unit is registered. Here, each established data path is anchored at a common user plane network function in the mobile communication network.

In some embodiments, the second indication is provided in response to no policy in the remote unit mandating a single-access data connection and in response to no local restriction of the remote unit mandating a single-access data connection. In some embodiments, the second session management request indicates an access traffic steering and splitting capability of the remote unit. In some embodiments, the processor further sends a response to the remote unit indicating establishment of the multi-access data connection.

In certain embodiments, in response to receiving the first session management request, the processor controls the transceiver to further send a query to a policy control function for at least one of: a) policy rules with multi-access routing information and b) policy rules with multi-access quality-of-service ("QoS") information associated with the requested data connection, where the query contains the second indication. In such embodiments, the processor determines to establish a multi-access data connection based on the at least one of policy rules with multi-access routing information and policy rules with multi-access QoS information received from the policy control function. In further embodiments, the policy control function queries a data management function to determine whether a network subscription of the remote unit allows a multi-access connection in response to receiving the first session management request. In such embodiments, determining to establish a multi-access data connection is based on the network subscription of the remote unit.

In some embodiments, the processor further establishes a multi-access data connection for the remote unit, the multi-access data connection being associated with a first access network with which the remote unit is registered and a second access network with which the remote unit is registered. In certain embodiments, the processor determines whether the remote unit is registered to the mobile communication network over both a first access network and a second access network based on a third indication received from the access management function. In certain embodiments, the first access network is an access network not defined by 3GPP (i.e., "non-3GPP access") and the second access network is an access network defined by 3GPP (i.e., "3GPP access"). In some embodiments, the second session management request is a Packet Data Unit ("PDU") session establishment request.

Disclosed herein is a first method for establishing a multi-access data connection, according to embodiments of the disclosure. The first method may be performed by a network function, such as the SMF 146 and/or session management apparatus 400. The first method includes receiving a first session management request via an access management function in a mobile communication network. Here, the first session management request contains: a second session management request sent by a remote unit, a first indication that the remote unit requests a single-access data connection, and a second indication that the remote unit allows the network to upgrade the data connection. The first method includes sending a request to the access management function to establish a data path for each access network with which the remote unit is registered. Here, each data path is anchored at a common user plane network function in the mobile communication network.

In some embodiments, the second indication is provided in response to no policy in the remote unit mandating a single-access data connection and in response to no local restriction of the remote unit mandating a single-access data connection. In some embodiments, the second session management request indicates an access traffic steering and splitting capability of the remote unit. In some embodiments, the first method further includes sending a response to the remote unit indicating establishment of the multi-access data connection.

In certain embodiments, the first method includes sending a query to a policy control function for at least one of: policy rules with multi-access routing information and policy rules with multi-access QoS information associated with the requested data connection in response to receiving the first session management request, where the query contains the second indication. In such embodiments, the first method further includes determining to establish the multi-access data connection includes determining based on the at least one of: policy rules with multi-access routing information and policy rules with multi-access QoS rules received from the policy control function. In further embodiments, the first method includes querying, by the policy control function, a data management function to determine whether a network subscription of the remote unit allows a multi-access connection in response to receiving the first session management request. In such embodiments, determining to establish a multi-access data connection is based on the network subscription of the remote unit.

In some embodiments, the processor further establishes a multi-access data connection for the remote unit, the multi-access data connection being associated with a first access network with which the remote unit is registered and a second access network with which the remote unit is registered. In certain embodiments, the first method includes determining that the remote unit is registered to the mobile communication network over both the first and second access networks is based on a third indication received from the access management function. In certain embodiments, the first access network is an access network not defined by 3GPP (i.e., "non-3GPP access") and the second access network is an access network defined by 3GPP (i.e., "3GPP access"). In some embodiments, the second session management request is a PDU session establishment request.

Disclosed herein is a second apparatus for establishing a multi-access data connection, according to embodiments of the disclosure. The second apparatus may be implemented by a UE, such as the remote unit 105, the UE 205, and/or the UE apparatus 300. The second apparatus includes a processor and a transceiver configured to communicate with a mobile communication network over at least one of: a first access network and a second access network. The processor transmits a request to establish a data connection and receives an accept message associated with the request to establish a data connection. Here, the request includes a first indication requesting a single-access data connection and a second indication that an upgrade to the data connection is allowed. Additionally, the accept message contains an indication that a multi-access data connection is to be established for carrying user-plane traffic over the first access network and the second access network.

In some embodiments, the processor examines local policy and local restrictions of the second apparatus to determine whether a single-access data connection is mandated. In such embodiments, the processor includes the second indication in response to determining that no local policy mandates a single-access data connection and that no local restriction mandates a single-access data connection.

In some embodiments, the processor receives (via the transceiver) a request to set up a first data bearer for a multi-access data connection over the first access network and receives a request to set up a second data bearer for the multi-access data connection over the second access network. In such embodiments, both the first data bearer and the second data bearer are used to carry user-plane traffic of the multi-access data connection. In further embodiments, the request to establish a data connection may include a first session identifier, where the request to set up the first data bearer and the request to set up the second data bearer are each associated with the first session identifier.

In certain embodiments, the request to establish a data connection indicates an access traffic steering and splitting capability of the second apparatus. In certain embodiments, the first access network is an access network not defined by 3GPP (i.e., "non-3GPP access") and the second access network is an access network defined by 3GPP (i.e., "3GPP access"), and where the request to establish a data connection is a PDU session establishment request.

Disclosed herein is a second method for establishing a multi-access data connection, according to embodiments of the disclosure. The second method may be performed by a UE, such as the remote unit 105, the UE 205, and/or the UE apparatus 300. The second method includes registering with a mobile communication network over at least one of: a first access network and a second access network and transmitting a request to establish a data connection. Here, the request includes a first indication requesting a single-access data connection and a second indication that an upgrade to the data connection is allowed. The second method includes receiving an accept message associated with the request to establish a data connection. Here, the accept message contains an indication that a multi-access data connection is to be established for carrying user-plane traffic over the first access network and/or the second access network.

In some embodiments, the second method includes examining local policy and local restrictions to determine whether a single-access data connection is mandated. Here, the request to establish a single-access data connection includes the second indication in response to determining that no local policy mandates a single-access data connection and that no local restriction mandates a single-access data connection.

In some embodiments, the second method includes receiving a request to set up a first data bearer for a multi-access data connection over the first access network and receiving a request to set up a second data bearer for the multi-access data connection over the second access network. Here, both the first data bearer and the second data bearer are used to carry user plane traffic of the multi-access data connection. In such embodiments, the request to establish a data connection may include a first session identifier, where the request to set up the first data bearer and the request to set up the second data bearer are each associated with the first session identifier.

In various embodiments, the first access network is an access network not defined by 3GPP ("non-3GPP access") and the second access network is an access network defined by 3GPP ("3GPP access"). In such embodiments, the request to establish a data connection may be a PDU session establishment request. In some embodiments, the request to establish a data connection indicates an access traffic steering and splitting capability of the UE.

Disclosed herein is a third apparatus for establishing a multi-access data connection, according to embodiments of the disclosure. The third apparatus may be implemented by a network function, such as the SMF 146 and/or session management apparatus 400. The third apparatus includes a processor and a transceiver that communicates with one or more network functions in a mobile communication network. The processor receives a first session management request via an access management function. Here, the first session management request containing: a second session management request sent by a remote unit, a first indication that the remote unit requests a single-access data connection and a second indication that the remote unit allows the network to upgrade the data connection. The processor determines whether to establish a multi-access data connection for the remote unit based on the second indication in the first session management request. Here, the multi-access data connection is associated with a first access network and a second access network. The processor sends a request to the access management function to establish a data path for each access network with which the remote unit is registered in response to determining to establish the multi-access data connection. Here, each data path is anchored at a common user plane network function in the mobile communication network.

In some embodiments, the processor determines whether the remote unit is registered to the mobile communication network over the first access network and the second access network based on a third indication received from the access management function. In some embodiments, the first access network is an access network not defined by 3GPP (i.e., "non-3GPP access") and the second access network is an access network defined by 3GPP (i.e., "3GPP access"). In such embodiments, the second session management request may be a PDU session establishment request.

In some embodiments, the second session management request indicates an access traffic steering and splitting capability of the remote unit. In some embodiments, the processor further sends a response to the remote unit in response to determining to establish a multi-access data connection, the response indicating establishment of the multi-access data connection.

In some embodiments, the second indication is provided in response to no policy in the remote unit mandating a single-access data connection and in response to no local restriction of the remote unit mandating a single-access data connection. In certain embodiments, the processor further sends a query to a policy control function for at least one of policy rules with multi-access routing information and policy rules with multi-access QoS information associated with the requested data connection in response to receiving the first session management request. In such embodiments, the query may contain the second indication. Moreover, the processor may determine to establish the multi-access data connection based on the at least one of policy rules with multi-access routing information and policy rules with multi-access QoS information received from the policy control function. In further embodiments, the policy control function may query a data management function to determine whether a network subscription of the remote unit allows a multi-access connection.

Disclosed herein is a third method for establishing a multi-access data connection, according to embodiments of the disclosure. The third method may be performed by a network function, such as the SMF 146 and/or session management apparatus 400. The third method includes receiving receives a first session management request via an access management function in a mobile communication network, the first session management request containing: a second session management request sent by a remote unit, a first indication that the remote unit requests a single-access data connection, and a second indication that the remote unit allows the network to upgrade the data connection. The third method includes determining whether to establish a multi-access data connection for the remote unit over a first access network and a second access network, based on the second indication in the first session management request and sending a request to the access management function to establish a data path for each access network with which the remote unit is registered in response to determining to establish the multi-access data connection. Here, each data path is anchored at a common user plane network function in the mobile communication network.

In some embodiments, the determination that the remote unit is registered to the mobile communication network over both the first and second access networks is based on a third indication received from the access management function. In some embodiments, the second indication is provided in response to no policy in the remote unit mandating a single-access data connection and in response to no local restriction of the remote unit mandating a single-access data connection.

In such embodiments, the third method may further include sending a query to a policy control function for at least one of: policy rules with multi-access routing information and policy rules with multi-access QoS information associated with the requested data connection in response to receiving the first session management request, where the query contains the second indication. In such embodiments, determining whether to establish the multi-access data connection includes determining based on the at least one of: policy rules with multi-access routing information and policy rules with multi-access QoS rules received from the policy control function.

In further embodiments, the third method also includes querying, by the policy control function, a data management function to determine whether a network subscription of the remote unit allows a multi-access connection in response to receiving the first session management request. In such embodiments, determining whether to establish a multi-access data connection is based on the network subscription of the remote unit.

In some embodiments, the third method includes sending a response to the remote unit in response to determining to establish a multi-access data connection, the response indicating establishment of the multi-access data connection. In various embodiments, the first access network is an access network not defined by 3GPP ("non-3GPP access") and the second access network is an access network defined by 3GPP ("3GPP access"), and where the second session management request is a PDU session establishment request. In some embodiments, the second session management request indicates an access traffic steering and splitting capability of the remote unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor; and
   a memory coupled to the processor, the processor configured to cause the apparatus to:
   receive a first session management request via an access management function, the first session management request including:
      a second session management request sent by a remote unit,
      a first indication that the remote unit requests a single-access data connection, and
      a second indication that the remote unit allows the network to upgrade the data connection; and
   send, to the access management function, a request to establish a data path for each access network with which the remote unit is registered, wherein each data path is anchored at a common user plane network function in the mobile communication network.

2. The apparatus of claim 1, wherein the processor is configured to determines whether the remote unit is registered to the mobile communication network over both a first access network and a second access network based on a third indication received from the access management function.

3. The apparatus of claim 1, wherein the second indication is provided in response to no policy in the remote unit mandating a single-access data connection and in response to no local restriction of the remote unit mandating a single-access data connection.

4. The apparatus of claim 3,
   wherein the processor is configured to cause the apparatus to send a query to a policy control function for:
      policy rules with multi-access routing information,
      policy rules with multi-access quality-of-service ("QoS") information associated with the requested data connection,
      or a combination thereof,
   wherein the query contains the second indication and is sent in response to receiving the first session management request, and
   wherein the processor is configured to determine to establish the multi-access data connection based on the policy rules with multi-access routing information, the policy rules with multi-access QoS information received from the policy control function, or the combination thereof.

5. The apparatus of claim 4, wherein determining to establish a multi-access data connection is based on whether a network subscription of the remote unit allows a multi-access connection.

6. The apparatus of claim 1, wherein the processor is configured to establish a multi-access data connection for the remote unit, the multi-access data connection being associated with a first access network with which the remote unit is registered and a second access network with which the remote unit is registered.

7. The apparatus of claim 6, wherein the first access network is an access network not defined by 3GPP ("non-3GPP access") and the second access network is an access network defined by 3GPP ("3GPP access").

8. The apparatus of claim 1, wherein the second session management request is a Packet Data Unit ("PDU") session establishment request.

9. The apparatus of claim 1, wherein the second session management request indicates an access traffic steering and splitting capability of the remote unit.

10. The apparatus of claim 1, wherein the processor is configured to send a response to the remote unit indicating establishment of the multi-access data connection.

11. A method comprising:
    receiving a first session management request via an access management function in a mobile communication network, the first session management request comprising:
       a second session management request sent by a remote unit,
       a first indication that the remote unit requests a single-access data connection, and
       a second indication that the remote unit allows the network to upgrade the data connection; and
    sending a request to the access management function to establish a data path for each access network with which the remote unit is registered, wherein each data path is anchored at a common user plane network function in the mobile communication network.

12. The method of claim 11, further comprising determining that the remote unit is registered to the mobile communication network over both the first access network and a second access network based on a third indication received from the access management function.

13. The method of claim 11, wherein the second indication is provided in response to no policy in the remote unit mandating a single-access data connection and in response to no local restriction of the remote unit mandating a single-access data connection.

14. The method of claim 13, further comprising:
sending a query to a policy control function for:
- policy rules with multi-access routing information,
- policy rules with multi-access quality-of-service ("QoS") information associated with the requested data connection,
- or a combination thereof, wherein the query contains the second indication and is sent in response to receiving the first session management request, and determining to establish the multi-access data connection comprises determining based on the policy rules with multi-access routing information, the policy rules with multi-access QoS information received from the policy control function, or the combination thereof.

15. The method of claim 14, further comprising:
querying, by the policy control function, a data management function to determine whether a network subscription of the remote unit allows a multi-access connection in response to receiving the first session management request, wherein determining to establish a multi-access data connection is based on the network subscription of the remote unit.

16. The method of claim 11, further comprising establishing a multi-access data connection for the remote unit, the multi-access data connection being associated with a first access network with which the remote unit is registered and a second access network with which the remote unit is registered.

17. The method of claim 16, wherein the first access network is an access network not defined by 3GPP ("non-3GPP access") and the second access network is an access network defined by 3GPP ("3GPP access").

18. The method of claim 11, wherein the second session management request is a Packet Data Unit ("PDU") session establishment request.

19. The method of claim 11, wherein the second session management request indicates an access traffic steering and splitting capability of the remote unit.

20. The method of claim 11, further comprising sending a response to the remote unit indicating establishment of the multi-access data connection.

* * * * *